US010717226B2

(12) United States Patent
Cobler

(10) Patent No.: US 10,717,226 B2
(45) Date of Patent: Jul. 21, 2020

(54) AGRICULTURE STORAGE BAGS AND METHOD TO MAKE SAME

(71) Applicant: Poly-America, L.P., Grand Prairie, TX (US)

(72) Inventor: Brad A. Cobler, Irving, TX (US)

(73) Assignee: Poly-America, L.P., Grand Prairie, TX (US)

( * ) Notice: Subject to any disclaimer, the term of this patent is extended or adjusted under 35 U.S.C. 154(b) by 177 days.

(21) Appl. No.: 15/496,055

(22) Filed: Apr. 25, 2017

(65) Prior Publication Data

US 2018/0304523 A1   Oct. 25, 2018

(51) Int. Cl.
| | | |
|---|---|---|
| *B29C 59/04* | (2006.01) | |
| *B65D 88/16* | (2006.01) | |
| *B29C 59/02* | (2006.01) | |
| *B30B 11/18* | (2006.01) | |
| *B29L 31/00* | (2006.01) | |
| *B29K 105/00* | (2006.01) | |

(52) U.S. Cl.
CPC .......... *B29C 59/046* (2013.01); *B29C 59/022* (2013.01); *B29C 59/04* (2013.01); *B30B 11/18* (2013.01); *B65D 88/16* (2013.01); *B29K 2105/258* (2013.01); *B29L 2031/7128* (2013.01)

(58) Field of Classification Search
CPC ..... B29C 59/046; B29C 59/022; B29C 59/04; B29D 22/003; B65D 88/16; B29K 2105/258; B29L 2031/7128
See application file for complete search history.

(56) References Cited

U.S. PATENT DOCUMENTS

| | | | | |
|---|---|---|---|---|
| 3,393,861 A | * | 7/1968 | Clavton | B65D 33/007 |
| | | | | 383/35 |
| 4,078,717 A | * | 3/1978 | Stearley | B29C 53/10 |
| | | | | 383/35 |
| 4,424,051 A | | 1/1984 | Lee et al. | |
| 4,484,606 A | | 11/1984 | Kosters | |
| 4,522,615 A | | 6/1985 | Bailen et al. | |
| 4,721,503 A | | 1/1988 | Rasmussen et al. | |
| 4,867,736 A | | 9/1989 | Rasmussen et al. | |
| 5,518,801 A | | 5/1996 | Chappell et al. | |
| 5,650,214 A | | 7/1997 | Anderson et al. | |
| 5,860,271 A | | 1/1999 | Inman et al. | |

(Continued)

*Primary Examiner* — Peter L Vajda
*Assistant Examiner* — S. Behrooz Ghorishi
(74) *Attorney, Agent, or Firm* — Daniel J. Layden; Brandon J. Lee

(57) ABSTRACT

The present invention relates to improvements for agricultural storage bags, more specifically agricultural storage bags having improved shock, tear and puncture resistance, and enhanced stretching properties. The agricultural storage bag has an embossed pattern of a plurality of embossed regions that are comprised of a plurality of linear embosses. Each embossed region is separated by a continuous unembossed region. Further disclosed is a method for forming the improved agricultural storage bags from a collapsed tube formed by a blown film extrusion process. More than one set of intermeshing rollers may be used to apply the embossed pattern to the improved agricultural storage bags. Once the storage bags are embossed, a folding operation may fold the bags into a plurality of annular folds so that the bags may be used with an agricultural bagging machine.

9 Claims, 19 Drawing Sheets

(56) References Cited

U.S. PATENT DOCUMENTS

| | | |
|---|---|---|
| 6,150,647 A | 11/2000 | Anderson et al. |
| 6,394,651 B2 | 5/2002 | Jackson |
| 6,458,447 B1 | 10/2002 | Cabell et al. |
| 6,513,975 B1 | 2/2003 | Jackson et al. |
| D518,648 S | 4/2006 | Broering et al. |
| 7,942,577 B2 | 5/2011 | Fraser et al. |
| 8,541,642 B2 | 9/2013 | Anderson et al. |
| 9,290,303 B2 | 3/2016 | Cobler |
| 9,487,334 B2 | 11/2016 | Cobler et al. |
| 9,517,862 B2 | 12/2016 | Ross |
| 9,546,277 B2 | 1/2017 | Cobler |
| 9,573,729 B2 | 2/2017 | Cobler |
| 2002/0148578 A1* | 10/2002 | Reilly .................. B31F 1/07 162/109 |
| 2003/0207640 A1 | 11/2003 | Anderson et al. |
| 2004/0137200 A1 | 7/2004 | Chhabra et al. |
| 2008/0228159 A1 | 9/2008 | Anderson et al. |
| 2008/0253699 A1 | 10/2008 | Hall |
| 2009/0094943 A1 | 4/2009 | Heilman et al. |
| 2010/0266222 A1 | 10/2010 | Rusnak et al. |
| 2015/0036951 A1 | 2/2015 | Fraser et al. |
| 2015/0071574 A1 | 3/2015 | Fraser et al. |
| 2016/0272417 A1 | 9/2016 | Cobler et al. |
| 2018/0273249 A1* | 9/2018 | Chiu .................. B65D 31/10 |

\* cited by examiner

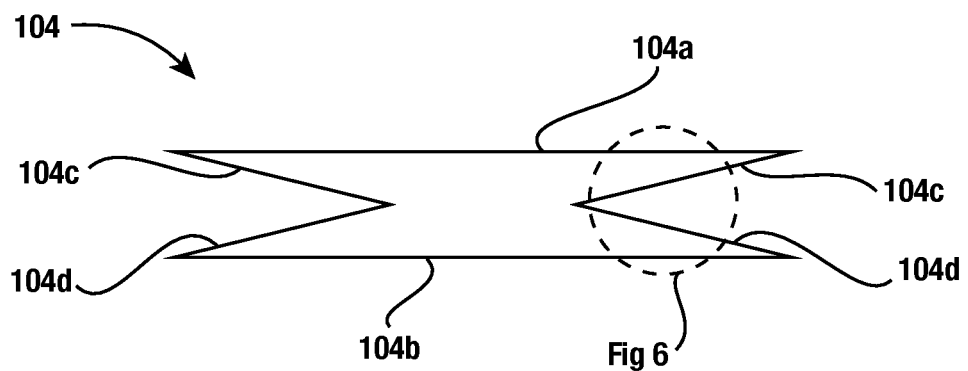
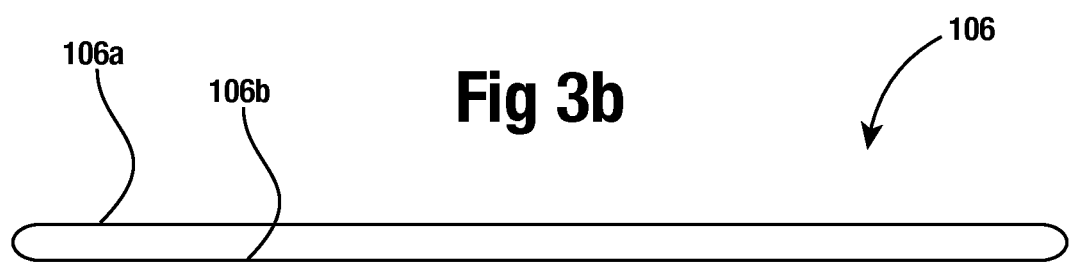

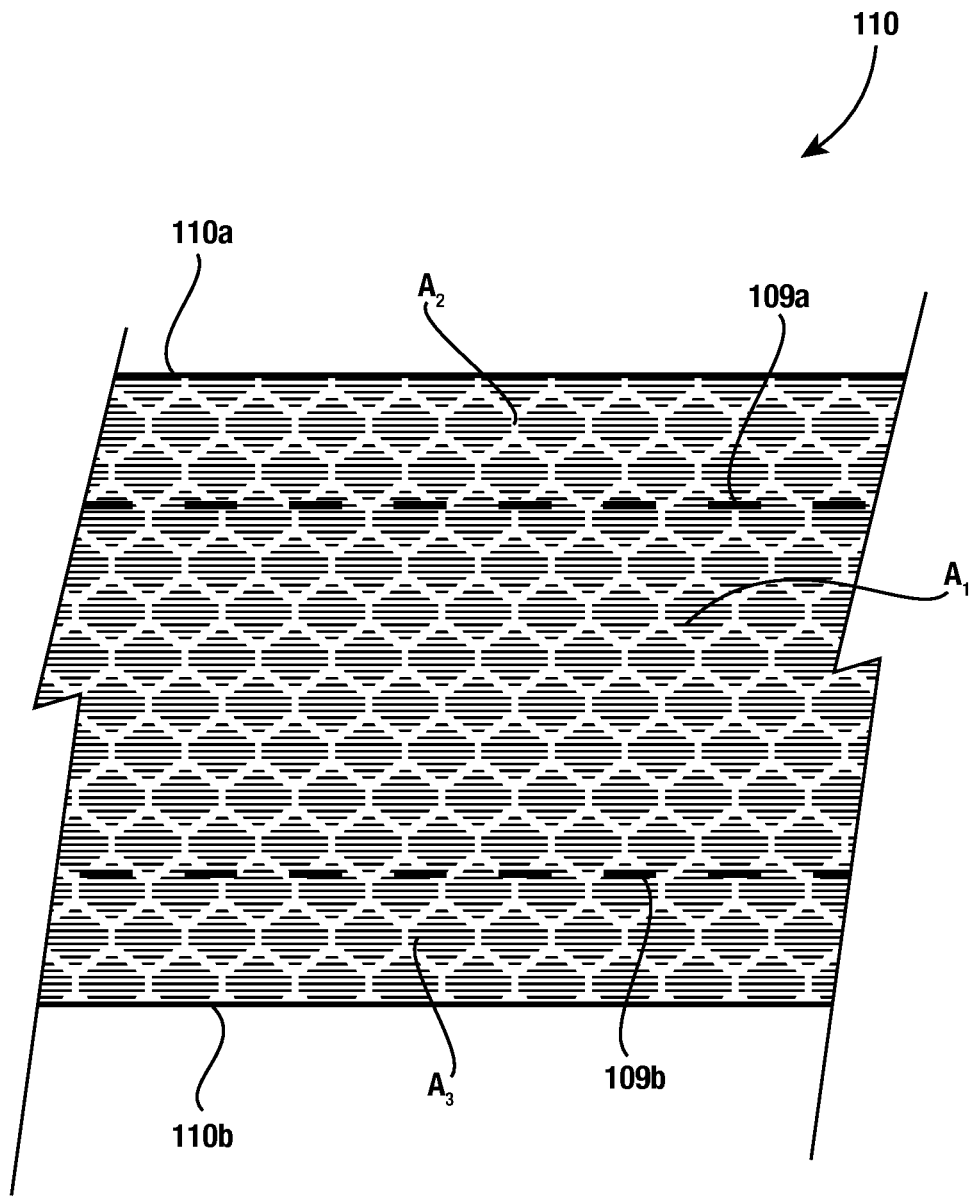

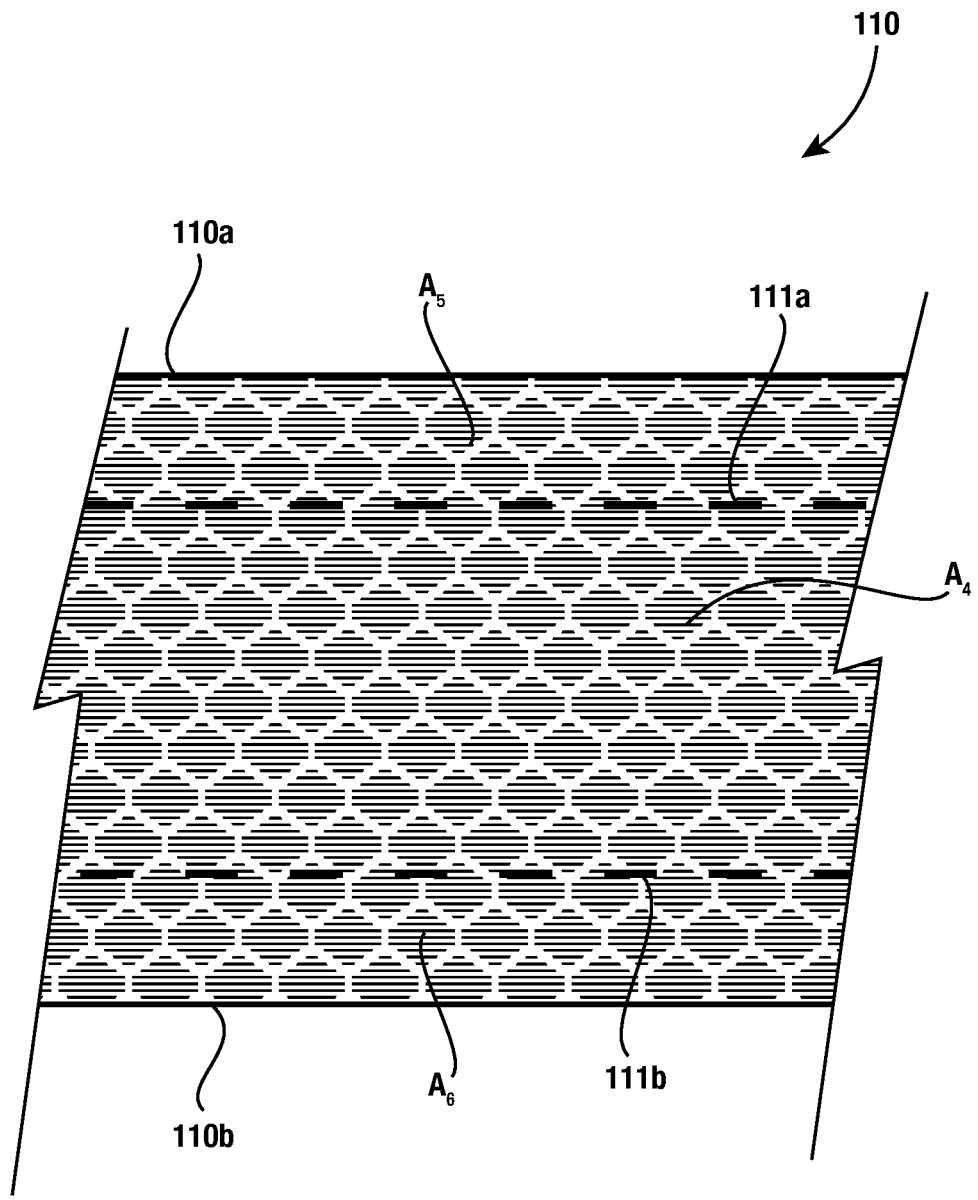

AGRICULTURE STORAGE BAGS AND METHOD TO MAKE SAME

CROSS-REFERENCE TO RELATED APPLICATIONS

Not applicable.

BACKGROUND OF THE INVENTION

1. Field of the Invention

The present invention relates to improvements in bags made from polymeric film and processes for manufacturing polymeric film bags.

2. Description of the Related Art

In the current state of the art, temporary structures are used for the storage of agricultural products. For example, agricultural storage bags, also known as silage bags and grain bags, are used in conjunction with filling and compression apparatus for in-field storage of agricultural products. These storage bags eliminate the need for permanent storage facilities and the expenses associated therewith, such as with the traditional storage silo. An important benefit deriving from the use of agricultural storage bags involves the ability to provide airtight storage, thus eliminating losses in the nutritional value of stored agricultural products characterized by other storage techniques.

Agricultural storage bags actually comprise large diameter, elongate, flexible plastic tubes. For example, a typical agricultural storage bag may have a diameter of up to twelve feet or more and a length of 500 feet or more. Agricultural storage bags are folded into a plurality of annular folds or rings prior to shipment, and are thereafter mounted on the housing or tunnel of loading machine or bag machine in this folded configuration. The bag machine functions to feed and compress agricultural material into the agricultural storage bag. As material is fed into the agricultural storage bag, the bag machine slowly moves away from the built up mass of loaded material, thereby pulling the bag off the rear of the tunnel of the bag machine as the bag is unfolded.

In general, agricultural storage bags are manufactured from polymeric film produced using techniques well-known in the art. The most common method for manufacture of agricultural storage bags is blown-film extrusion. In blown film extrusion, polymeric resin is fed into an extruder where an extrusion screw pushes the resin through the extruder. The extrusion screw compresses the resin, heating the resin into a molten state under high pressure. The molten, pressurized resin is fed through a blown film extrusion die having an annular opening. As the molten material is pushed into and through the extrusion die, a polymeric film tube emerges from the outlet of the extrusion die. The direction that the tube is extruded out of the die is commonly referred to as the machine direction while the direction perpendicular to the machine direction is commonly referred to as the cross direction.

The polymeric film tube is blown or expanded to a larger diameter by providing a volume of air within the interior of the polymeric film tube. The combination of the volume of air and the polymeric film tube is commonly referred to as a bubble between the extrusion die and a set of nip rollers. As the polymeric film tube cools travelling upward toward the nip rollers, the polymeric film tube solidifies from a molten state to a solid state after it expands to its final diameter and thickness. Once the polymeric film tube is completely solidified, it passes through the set of nip rollers and is collapsed into a collapsed polymeric tube, also referred to as a collapsed bubble. Due to the large size utilized by most agricultural storage bags, during the extrusion process the solidified tube is gusseted inward on opposing sides prior to being collapsed by the set of nip rollers. The gusseting minimizes the amount of space and size of equipment required for collapsing the bubble after extrusion, reducing the overall width of the collapsed tube in comparison to an un-gusseted collapsed tube.

In a typical blown film extrusion process the tear strength of the film varies considerably between the machine and cross directions of the film. The molecular orientation of the polymer is typically biased in the machine direction which leads to a higher tear strength in the cross direction than in the machine direction. Thus, a tear in the film has a tendency to propagate in the machine direction rather than in the cross direction.

As previously discussed, agricultural material is fed and compressed into an agricultural storage bag by a bag loading machine. A typical bag machine has a fixed diameter tunnel and hence will only accept agricultural storage bags of a certain diameter. For instance, a bag machine intended for use with eight-foot diameter agricultural storage bags will typically not function to fill nine or ten foot diameter agricultural storage bags. However, many agriculture operations have become larger and more efficient; thus requiring additional storage capacity than previously required. Furthermore, preparing an agricultural storage bag for filling and sealing of a filled bag is cumbersome, time consuming, and can utilize valuable space for storage of the bag. Therefore, it would be desirable for a certain diameter of an agricultural storage bag if the bag could hold a greater volume of agricultural products so that filling of the storage bags was more efficient. Furthermore, as previously discussed, it is desirable to minimize the amount of air entrapped within the bag after filling. Therefore, it would be desirable for agricultural storage bags to able to flex, expand, and conform better to the volume of agricultural product as filled. Due to the necessity of holding tension in the agricultural storage bag as it is filled in the machine direction of the bag, it would be desirable for the bags to expand in the cross direction as the bag is filled rather than in the machine direction of the bag.

To preserve the nutritional value of stored agricultural products such as silage, exposure to oxygen of the stored product must be limited until a time close to when the product is consumed. However, a well-known and unresolved problem of agricultural storage bags is the risk of a tear propagating down a bag's length when opening the bag to access the stored agricultural product. As discussed above, any tear in the bag has a tendency to propagate in the machine direction of the bag, and may zipper down the entire length of the bag. If such a tear occurs, it is necessary to quickly re bag the product to prevent fungi or other undesirable microbes from further adversely affecting the nutritional value of the feed or grain. Thus, it would also be desirable for agricultural storage bags to have features to prevent the propagation of tears without unnecessarily increasing the thickness of the bags.

An example of a means to accomplish a flexible or expandable film is disclosed in U.S. Pat. No. 5,650,214 issued to Anderson et al., filed on May 31, 1996, and entitled Web Materials Exhibiting Elastic-Like Behavior and Soft Cloth-Like Texture. The Anderson patent discloses using a plurality of embossed ribs defining diamond-shaped areas with a network of unembossed material between the diamond-shaped areas that forms a strainable network. The unembossed area comprises a network of straight, linear unembossed material extending in two perpendicular directions. The strainable network provides for an elastic-like behavior along at least one axis when the embossed web material is subjected to an applied and subsequently released elongation.

U.S. Pat. No. 9,290,303 issued to Brad A. Cobler with a filing date of Oct. 24, 2013, herein incorporated by reference into this disclosure, discloses use of an embossed pattern on polymeric film that balances both properties of expansion and improved resistance to tear, into a single, practicable polymeric film. Cobler discloses that the embossing pattern comprises a plurality of embossed regions comprised of a plurality of parallel, linear embosses. The plurality of embossed regions is arranged so that a straight line cannot traverse the polymeric film without intersecting at least one of the pluralities of embossed regions. This pattern defines tortuous tear paths in the film which consumes more energy as the tear propagates and can help in limiting the impact of the tear in a bag or polymeric film. Furthermore, the application of the linear embosses provide localized orientation in the cross direction of the film to increase the machine direction tear strength of the film of the agriculture storage bags to prevent tears propagating in the machine direction.

It is known to apply the emboss pattern disclosed in Anderson and Cobler to films used to construct articles such as diapers, sanitary napkins, and trash bags. However, applying such an emboss pattern to agricultural storage bags is not known. Due to the strength and durability required of agricultural storage bags, the film used to construct agricultural storage bags is much thicker than the film used to construct polymeric trash bags. For instance, most trash bags range in thickness from 0.7 to 1.2 mils while agricultural storage bags typically have a film thickness between 7.5 and 10 mils. Furthermore, the width of the embossed area of a trash bag is much less than the width of the contemplated embossed area of an agricultural storage bag. For instance, the embossed area on a trash bag is typically 30 inches or less while a 12-foot agricultural storage bag has a flattened width of over 18 feet.

The excessive thickness and width of agriculture storage bags presents inherent difficulties in applying the aforementioned embossing patterns. Nonetheless, it would be desirable to provide agricultural storage bags with the embossing pattern as disclosed in the Cobler patent. Agricultural storage bags with this pattern would provide bags with the ability to expand to increase the volume of agricultural product held for a given diameter of bag. The flexible film of the bags would also allow the bags to conform to the agricultural product stored within and decrease the likelihood of unwanted air in the agricultural storage bag. Additionally, the tortious paths and the localized orientation of the embossed pattern would decrease the likelihood of tears propagating down the length of agricultural storage bags. The present invention addresses these objectives and methods to overcome the difficulties in applying the embossing pattern to agricultural storage bags.

SUMMARY OF THE PRESENT INVENTION

In at least one embodiment of the present invention, an embossed agricultural storage bag may be formed. To form the embossed agricultural storage bag, a gusseted tube of polymeric film may be unrolled and supplied to an embossing operation. The gusseted tube may be expanded and un-gusseted into a flattened tube. A pair of intermeshing rollers may emboss an embossed pattern into the flattened tube. The embossed pattern may comprise a plurality of embossed regions. Each embossed region may be separated from adjacent embossed regions by a continuous unembossed arrangement. Once the flattened tube is embossed, it may be folded into a plurality of annular folds. In at least certain embodiments, the embossed pattern may extend across an entire width of the flattened tube.

The pair of intermeshing rollers of the embossing process may counter-rotate in relation to each other. Each roller may have a rotational axis and the two axes of the rollers may be parallel with each other. The axes of each of the pair of intermeshing rollers may be perpendicular to the machine direction of the flattened tube. The pair of intermeshing rollers may comprise a first roller and a second roller. The second roller may include a plurality of grooves dispersed from a first end to a second end of the first rollers. Each groove of the plurality of grooves may extend circumferentially around the roller's axis about the surface of the second roller and extend perpendicularly away from the axis of the first roller. The plurality of grooves on the second roller may intermesh with an embossing pattern on the first roller. Both intermeshing rollers may rotate in a direction that the flattened tube is moving so that the tube is drawn through the pair of intermeshing rollers. A pair of post-embossing rollers downstream from the pair of intermeshing rollers and a pair of pre-embossing rollers upstream of the intermeshing rollers may be provided to control the tension in the flattened tube when it passes through the intermeshing rollers.

In at least certain embodiments, the embossing pattern may comprise a plurality of embossment regions defined in the first roller and each embossment region may comprise a plurality of arcuate embossment ridges. Each of the plurality of embossment ridges may extend circumferentially around the first roller and extend away perpendicularly from the axis of the second roller. Each embossment ridge may be parallel to each other. Each embossment region may be defined by a continuous embossment boundary. The embossment boundary may be generally flat in relation to the embossment ridges and follow the arcuate surface of the first roller. The embossment boundary may comprise at least a plurality of first segments and a plurality of second segments. The plurality of first segments may extend in a first direction and the plurality of second segments may extend in a second direction. The first and second directions may be distinct from each other. The embossment boundary may further comprise a plurality of third segments extending in a third direction with the third direction distinct from the first and second directions. The embossment boundary may also be devoid of embossment ridges. Each embossment region may comprise between seven and eleven embossment ridges.

In a further embodiment of the present invention, an embossed agricultural storage bag may be formed. To form the embossed agricultural storage bag, a gusseted tube of polymeric film may be supplied from roll stock or from a blown film extrusion process. The gusseted tube may comprise at least four layers of film including upper and lower outer layers and upper and lower inner layers with the inner layers in between the outer layers. A pair of intermeshing rollers may emboss an embossed pattern simultaneously onto the at least four layers of film. The intermeshing rollers may contact directly the outer layers and indirectly contact the inner layers via the outer layers. The embossed pattern may comprise a plurality of embossed regions. Each embossed region may be separated from adjacent embossed regions by a continuous unembossed arrangement. Once the flattened tube is embossed, it may be folded into a plurality of annular folds.

In at least certain embodiments, the pair of intermeshing rollers may emboss a plurality of linear embossments into each layer comprising the embossed pattern. The plurality of linear embossments may have generally the same height within a particular layer of the at least four layers. A height of the plurality of linear embossments of the upper outer layer may be greater than a height of the plurality of linear embossments of the lower outer layer. Furthermore, a height of the plurality of linear embossments of the upper inner layer may be greater than a height of the plurality of linear embossments of lower inner layer. The embossed pattern may extend across an entire width of the flattened tube.

A further embodiment of the invention is an embossed agricultural storage bag. The bag may comprise a collapsed tube of polymeric film. The collapsed tube may have a machine direction and a cross direction with the cross direction perpendicular to the machine direction. The collapsed tube of polymeric film may have at least upper and lower layers. The upper and lower layers may extend in the cross direction from a first side to a second side of the collapsed tube and in the machine direction from a first end to a second end of the collapsed tube. The first layer and the second layer may comprise an embossed pattern. The embossed pattern may comprise a plurality of embossed regions of linear embossments and each embossed region may be separated from adjacent embossed regions by a continuous unembossed arrangement.

The embossed pattern of the embossed agricultural storage bag may further extend continuously from the first side to the second side of the bag. Each linear embossment of the embossed pattern may be generally parallel to the machine direction. Additionally, the embossed pattern may be formed by a pair of intermeshing rollers. The upper and lower layers may each comprise a plurality of sections. The plurality of sections of the upper layer and the lower layer may comprise a central section, a first outer section, and a second outer section. Each one of the sections may extend lengthwise in the machine direction. Each section may comprise the embossed pattern and the embossed pattern may comprise a plurality of linear embossments. Each of the linear embossments may have generally the same height within a section of the plurality of sections. A height of the plurality of linear embossments of the first and second outer sections of the upper layer may be less than a height of the plurality of linear embossments of the central section of the upper layer.

In at least certain embodiments, the continuous unembossed arrangement may comprise at least a plurality of first segments and a plurality of second segments. The plurality of first segments may extend in a first direction and the plurality of second segments may extend in a second direction. The first and second directions distinct from each other. The embossed pattern may extend continuously from the first side to the second side of the collapsed tube. Each of the linear embossments may be generally parallel to the machine direction. The embossed pattern may be formed by a pair of intermeshing rollers.

In a further embodiment of the invention, an embossed agricultural storage bag may be formed. A collapsed tube of polymeric film may be supplied. The collapsed tube may have a machine direction. A width of the collapsed tube may be divided into a plurality of fractional widths. A plurality of pairs of intermeshing rollers may emboss an embossed pattern into each of the plurality of fractional widths to form an embossed tube. Each of the fractional widths may be embossed by a different pair of intermeshing rollers. The embossed pattern may comprise a plurality of embossed regions and each embossed region may be separated from adjacent embossed regions by a continuous unembossed arrangement. The embossed tube may be folded into a plurality of annular folds.

In at least certain embodiments, the plurality of fractional widths may comprise at least a first fractional width and a second fractional width. The plurality of pairs of intermeshing roller may comprise at least first and second pairs of intermeshing rollers. The first pair of intermeshing rollers may emboss the embossed pattern into the first fractional width. The second pair of intermeshing rollers may emboss the embossed pattern into the second fractional width. The first pair of intermeshing rollers may emboss a partial width of the second fractional width. The second pair of intermeshing rollers may emboss a partial width of the first fractional width. The first pair of intermeshing rollers may not emboss the second fractional width and the second pair of intermeshing rollers may not emboss the first fractional width. The first fractional width may be adjacent to and continuous with the second fractional width. Embossing of the first and second fractional widths may result in the entire width of the collapsed tube being embossed. The first embossed pattern may be substantially the same as the second embossed pattern.

In further embodiments, folding of the embossed tube into a plurality of annular folds may comprise clamping a leading edge section of the embossed tube. The folding may comprise expanding an interior first section of the embossed tube. The first section may be folded over the leading edge section of the embossed tube. The first folded section may be clamped to the leading edge of the embossed tube. An interior second section of the embossed tube may be expanded and folded over the first folded section. The first folded section and the leading edge section may be unclamped. The second folded section may then be clamped against the first folded section and the leading edge section. A third section of the embossed tube may then be expanded and folded over the second folded section.

In additional embodiments, the folding of the embossed tube may further comprise a plurality of lower clamping members cooperating with one or more fold supporting surfaces to clamp the leading edge of the embossed tube. A plurality of upper clamping members may expand the interior first section and fold the first section towards the leading edge section. The plurality of lower clamping members may unclamp the leading edge section of the embossed tube and clamp the first section to the leading edge section.

BRIEF DESCRIPTION OF THE RELATED DRAWINGS

A full and complete understanding of the present invention may be obtained by reference to the detailed description of the present invention and certain embodiments when viewed with reference to the accompanying drawings. The drawings can be briefly described as follows.

FIG. 3a depicts a cross-sectional view of the gusseted collapsed tube of FIGS. 1a and 1b taken along line A-A of FIG. 1a.

FIG. 3b depicts a cross-sectional view of the un-gusseted collapsed tube of FIGS. 1a and 1b taken along line B-B of FIG. 1a.

FIG. 6 depicts a partial detailed view of the cross sectional view of FIG. 3a.

FIG. 7a depicts a top plan view of the collapsed tube of the second embodiment.

FIG. 7b depicts a bottom plan view of the collapsed tube of the second embodiment.

DETAILED DESCRIPTION OF THE INVENTION

The present disclosure illustrates several embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms are not intended to conclusively limit the scope of protection.

Figure 1A:
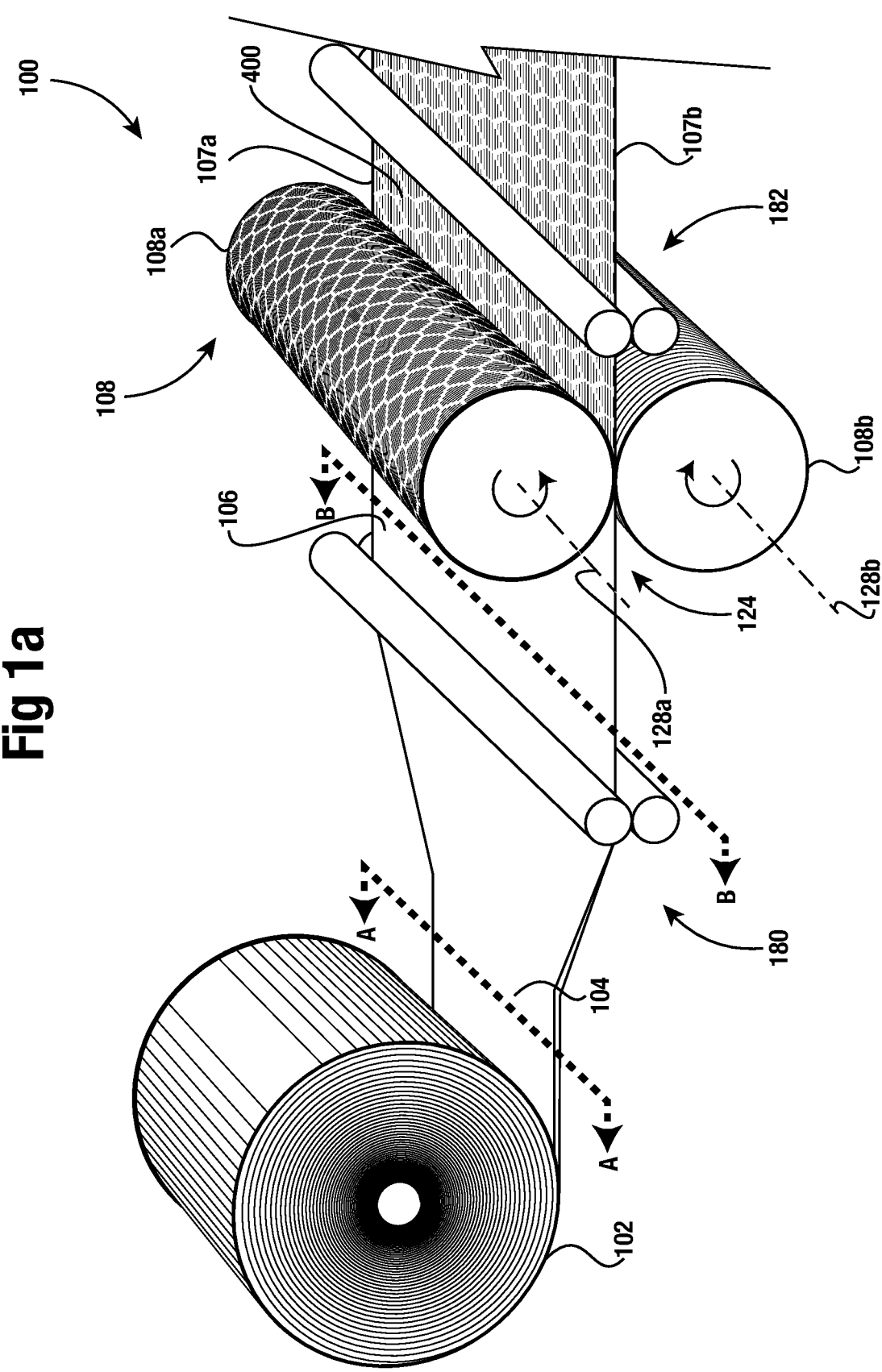
FIG. 1a depicts a partial perspective view of a first embodiment of the present invention.
Figure 2:
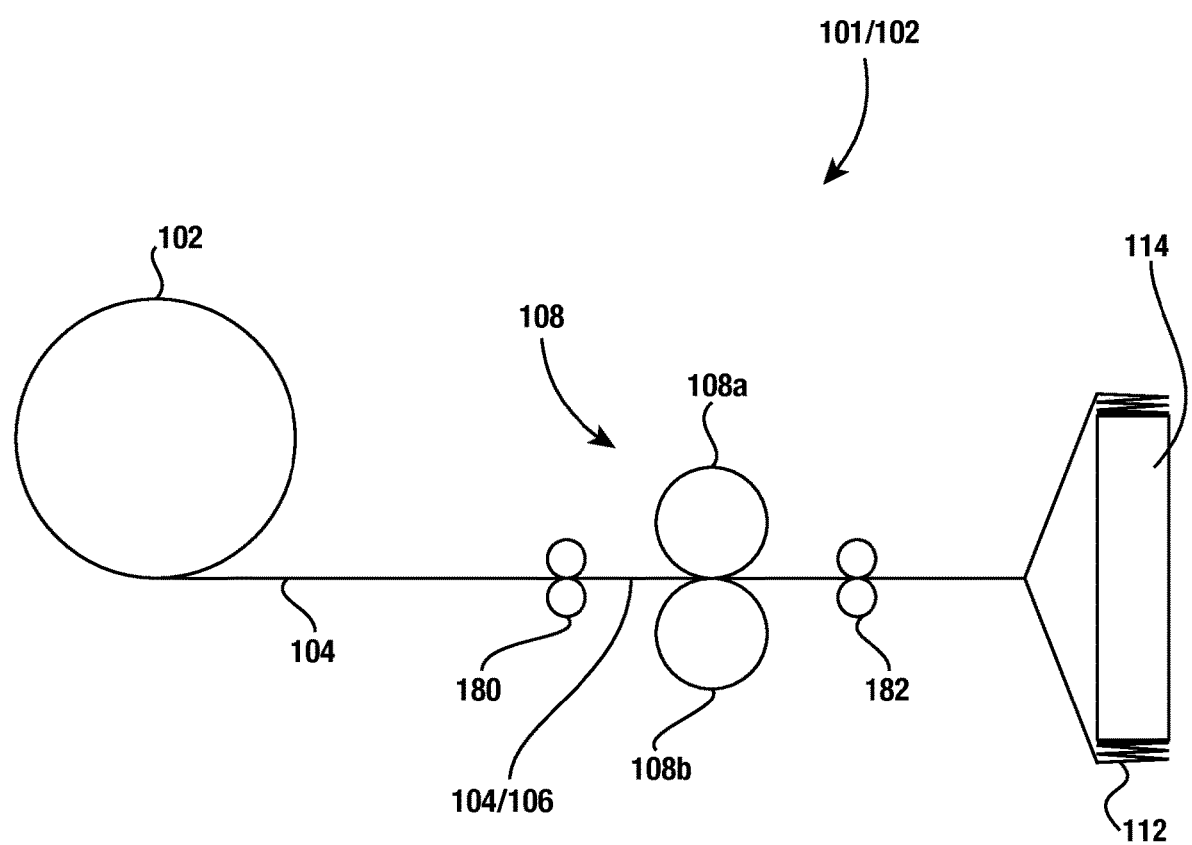
FIG. 2 depicts a schematic view of the invention as shown in FIGS. 1a and 1b.

Referring initially to FIGS. 1a and 2, a process and apparatus for forming an embossed agricultural storage bag is shown. The agricultural storage bags may be formed by a blown film extrusion process. The blown film extrusion process begins by molten polymeric resin being extruded through an annular die of an extruder to form a bubble or tube of molten polymeric film. The direction that the film is extruded out of the die is commonly referred to as the machine direction (MD). The direction transverse to the machine direction is commonly referred to as the cross direction (CD). The blown film extrusion process is well known in the art and is further explained in U.S. Pat. No. 7,753,666, filed on Jun. 12, 2006, which is hereby incorporated by reference.

The polymeric resin used in the blown film extrusion process may vary. However, for forming polymeric agricultural storage bags, a polyethylene resin is commonly used. In the current state of the art for polymeric agricultural storage bags, a blend of various polyethylene polymers may be used. The remaining portion of the polymer blend may include additives including, but not limited to, coloring additives, anti-blocking agents, and/or stabilizers.

As shown in FIG. 1a, in an agricultural storage bag forming process and apparatus 100, a roll stock 102 of gusseted polymeric film can be unrolled into a generally flat web of a gusseted tube 104. As more clearly shown in the cross-section of FIG. 1a shown in FIG. 3a, with the height of the tube exaggerated for purposes of illustration, the gusseted tube 104 can comprise at least four layers due to the gusseted configuration. As shown in FIG. 3a, the gusseted tube can comprise an outer upper layer 104a, an outer lower layer 104b, an inner upper layer 104c, and an inner lower layer 104d. The inner upper and lower layers 104c and 104d can comprise opposing first and second sides if the gusseted tube 104 is gusseted symmetrically between two opposing sides of a polymeric tube as shown by FIG. 3a.

Returning to FIG. 1a, once roll stock 102 is unrolled into flat gusseted tube 104, gusseted tube 104 may be un-gusseted and expanded into flattened tube 106, as illustrated by the cross-sectional view of tube 106 in FIG. 3b. As further shown in FIG. 3b, flattened tube 106 comprises an upper layer 106a and a lower layer 106b (with the distance between layers exaggerated for purposes of illustration). Due to the expansion and removal of the gusset, flattened tube 106 has only two layers without any inner layers. Now returning to FIG. 1a, the flattened tube 106 can pass through a pair of intermeshing rollers 108. The intermeshing rollers 108 can emboss an embossed pattern 400 on to both the upper and lower layers 106a and 106b of flattened tube 106. The embossed pattern 400 can extend across an entire width of tube 106 from a first side 107a to a second side 107b of flattened tube 106.

As further shown in FIG. 2, once the embossed pattern 400 is applied to flattened tube 106, the flattened tube 106 can be expanded into an annular cross-section and folded into a plurality of annular folds 112 by a folding operation 114 (further detailed below and in FIGS. 10-17). Once formed, an agricultural storage bag can comprise a defined length of flattened tube 106 with the bag extending in the machine direction of the tube from a first end to a second of the flattened tube 106.

Figure 1B:
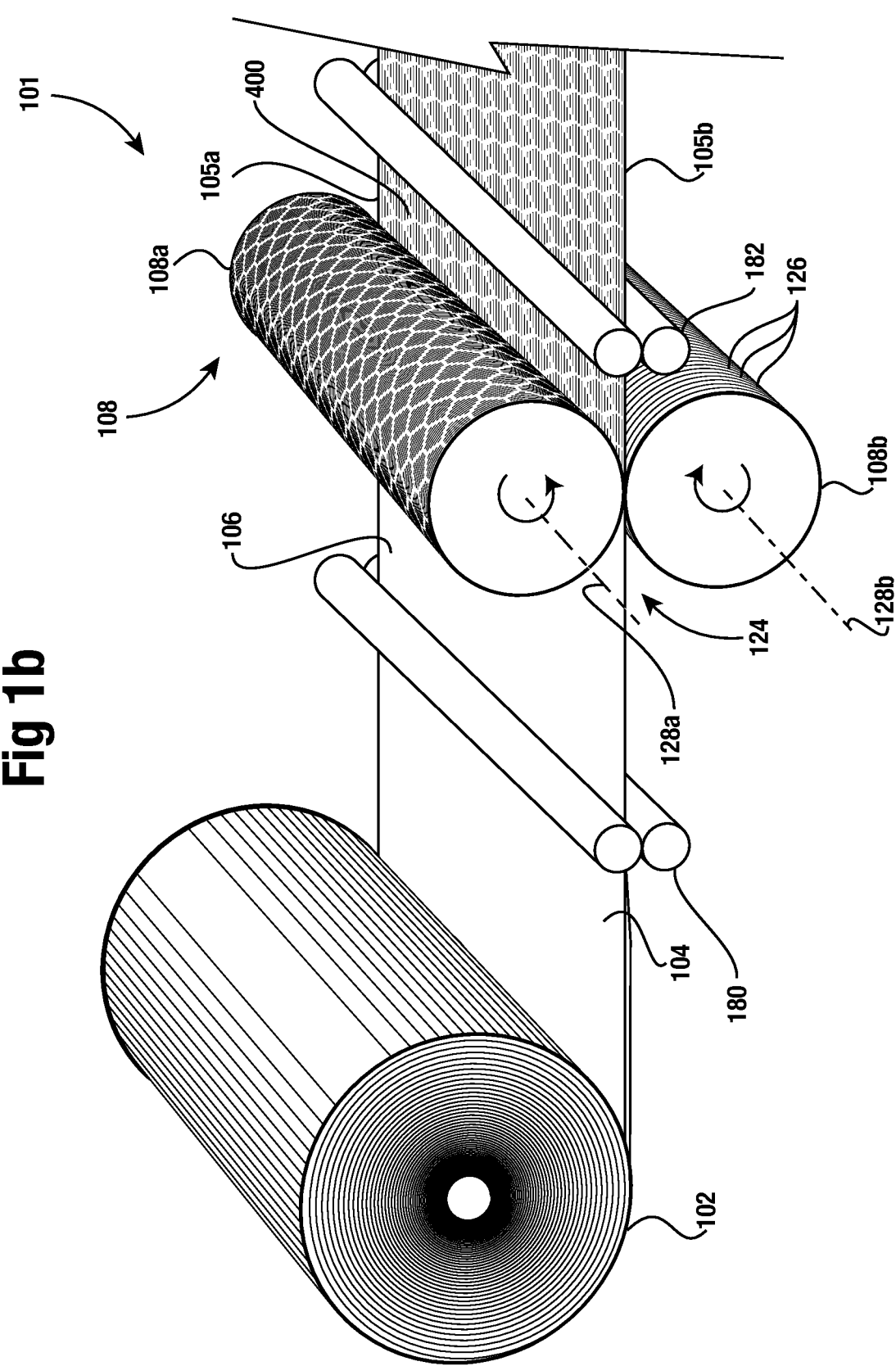
FIG. 1b depicts a partial perspective view of a second embodiment of the present invention.

Now examining FIG. 1b, rather than un-gusseting gusseted tube 104 prior to embossing, in an agricultural storage bag forming process 101, the gusseted tube 104 can be embossed in gusseted form once tube 104 is unrolled from roll stock 102. In the embodiment shown in FIG. 1b, four layers and six separate sections are embossed simultaneously by embossing rollers 108. The embossed pattern 400 formed by embossing rollers 108 can extend from a first side 105a to a second side 105b of gusseted tube 104. As previously discussed for FIG. 3a, these sections include upper outer layer 104a, first and second upper inner layers 104c, first and second lower inner layers 104d, and lower outer layer 104b. Once gusseted tube 104 is embossed, it can be un-gusseted and expanded into an annular cross section.

As discussed above, tube 104 or 106 is supplied by roll stock 102. However, in an alternative embodiment, the embossed agricultural storage tube may be formed by an in-line process with tube 104 or 106 supplied directly from the upper nip roller of a blown film extrusion process.

Due to the four layer structure of gusseted tube 104, the intermeshing rollers 108 contact directly outer layers 104a and 104b when embossing the gusseted tube 104 but only contact indirectly the inner layers 104c and 104d via the outer layers. Nonetheless, once the gusseted tube 104 is expanded into an annular cross section, it can be folded into a plurality of annular folds 112 as illustrated generally in FIG. 2.

As further shown in FIGS. 1a and 1b, intermeshing rollers 108 can comprise first and second intermeshing rollers 108a and 108b. First and second intermeshing rollers 108a and 108b can have corresponding first and second rotational axes 128a and 128b. The first roller 108a can rotate in an opposite direction from the second roller 108b so that tube collapsed 104 or 106 is feed through nip 124 defined by the two intermeshing rollers 108a and 108b. As the two rollers 108a and 108b approach each other, the two rollers travel in the machine direction. As further shown in FIGS. 1a and 1b, the collapsed tube 104 or 106 can enter nip 124 defined by the pair of intermeshing rollers 108a, 108b. The rotational axes 128a, 128b of each roller 108a, 108b can be parallel to each other and transverse to the machine direction (MD) of collapsed tube 104 or 106 as shown in the figures. The diameter and length of the first intermeshing roller 108a and the second intermeshing roller 108b can be approximately equal in at least certain embodiments.

As illustrated by FIGS. 1a and 1b, the second intermeshing roller 108b can have a plurality of concentric ring-shaped ridges 126 and corresponding concentric grooves extending about the circumference of the second roller 108b. The ridges 126 can be evenly dispersed about the length of the roller 108b. As explained further below in the description of FIG. 5, the first roller 108a can have an embossing pattern defined about its surface. The concentric ridges 126 of the second roller 108b are constructed to intermesh with the embossing pattern of the first roller 108a. With the embossing pattern defined on the first roller 108a, as the collapsed tube 104 or 106 enters the nip of the intermeshing rollers 108a, 108b, the film of the collapsed tube 104 or 106 is embossed with the embossed pattern 400.

The embossed pattern 400 utilized on the collapsed tube as shown generally in FIGS. 1a-1b allows agricultural storage bags manufactured from the disclosed process to expand in the cross-direction, in the width direction of the bags, from a first side edge to a second side edge of the bag. This expansion allows for increased capacity of the bags when filled with agricultural products. The embossed pattern 400 further prevents the propagation of tears due to the tortious path defined by the embossed pattern 400 since a straight line cannot pass through more than one embossed region without intersecting an adjacent embossed region.

Figure 4:
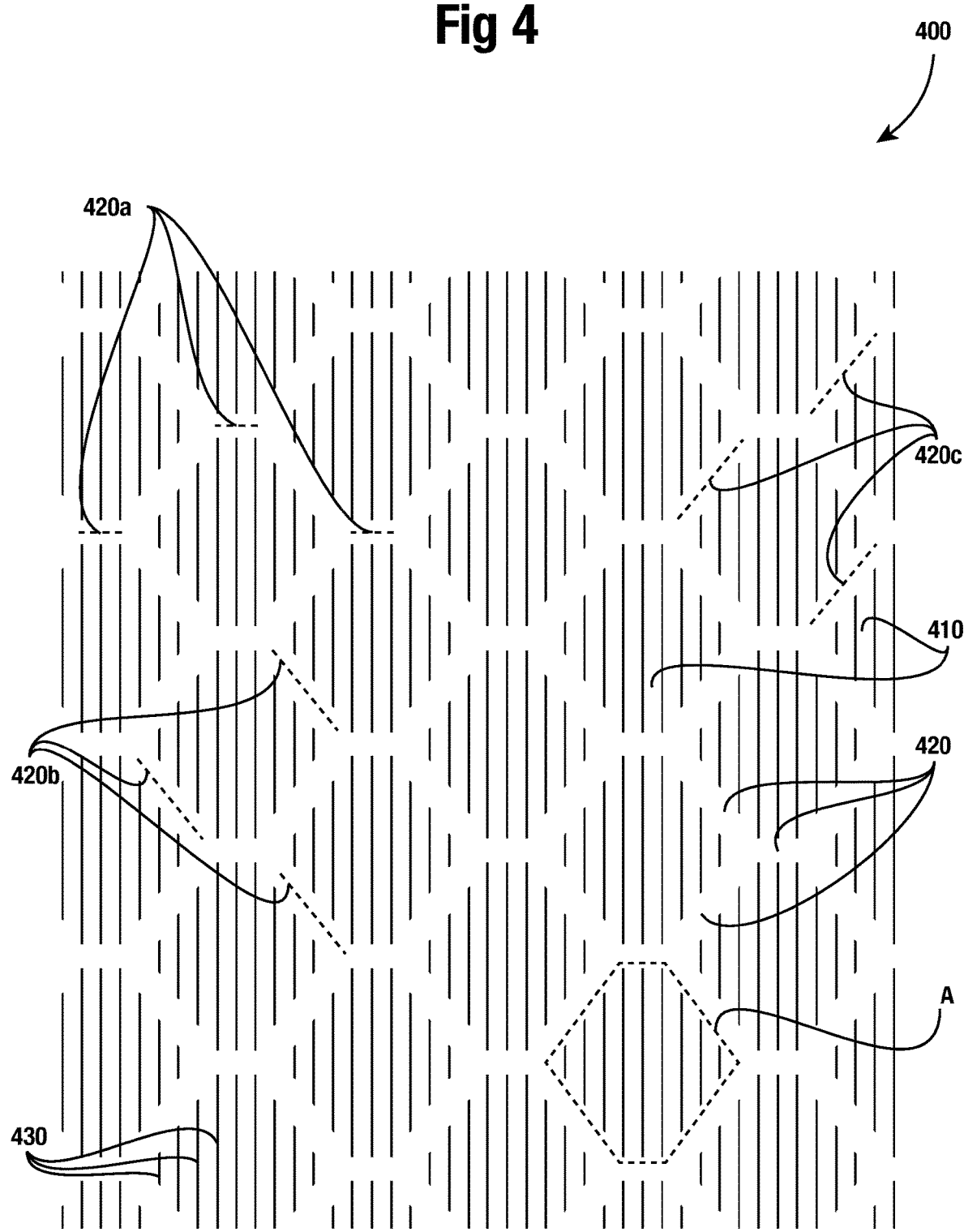
FIG. 4 depicts a schematic plan view of an embossed pattern applied to the collapsed tubes of FIGS. 1a and 1b.

Now turning to FIG. 4, a detailed schematic view of a certain embodiment of the embossed pattern 400 as illustrated generally in FIGS. 1a and 1b is shown. The embossed pattern 400 has a plurality of embossed regions 410, each embossed region 410 has a generally hexagonal shape with each embossed region 410 separated by a continuous unembossed arrangement 420. One of the hexagonal shapes is indicated by dashed lines A in FIG. 4. The dashed lines of A are shown for reference only and form no structure of the disclosed invention. Each embossed region 410 is shown as defined by nine parallel and adjacent linear embossments 430. The two opposing horizontally extending sides of each embossed region 410 is defined by three middle adjacent parallel linear embossments 430 with equal length; each horizontal side of the hexagon formed by adjacent ends of the three linear embossments 430. Each of the other four diagonal sides of the hexagon can be defined by an endpoint of an outer emboss of the three middle adjacent linear embossments 430 and adjacent endpoints of three other outer adjacent linear embossments 430. Each of the three other adjacent linear embossments 430 can decrease in length the same amount as the adjacent linear embossment 430.

The hexagonal shaped embossed regions 410 of FIG. 4 can be oriented such that opposing vertices of each hexagon are at opposing sides of each hexagon as illustrated in FIG. 4. Adjacent to the vertices can be two short opposing, linear embossments 430 at each end of each embossed region 410. These opposing vertices encourage each embossed region to fold-in when the linear embossments unfold in the horizontal direction. Hence, a film with the embossed pattern 400 of FIG. 4 expands in the horizontal direction but not in vertical direction. This expansion is much greater and at a much lower force than would be required to stretch the film without the embossed pattern 400.

FIG. 4 depicts the unembossed arrangement 420 having a plurality of first segments 420a, a plurality of second segments 420b, and a plurality of third segments 420c. Each embossed region 410 is bounded by two first segments 420a, two second segments 420b, and two third segments 420c. Each first segment 420a extends in a first direction that is generally horizontal. Each second segment 420b extends in a second direction that is oblique to the first direction. Each third segment 420c extends in a third direction that is oblique to both the first direction and the second direction. The first, second, and third directions are all distinct from each other. As shown in FIG. 4, each of the segments 420a, 420b, or 420c are interrupted by an adjacent embossed region 410, failing to extend past more than one embossed region 410.

As further shown in FIG. 4, the first segments 420a intersect both the second segments 420b and third segments 420c. Furthermore, a first segment 420a, a second segment 420b, and a third segment 420c all intersect each other adjacent to both the upper and lower vertices of each embossed region 410. In a particular embodiment of the embossed pattern 400, the angle formed by each intersection by a first segment 420a with a second segment 420b or third segment 420c can be approximately 54 degrees or the supplementary angle of 126 degrees. In the same embodiment, the angle formed by each intersection of a second segment 420b with a third segment 420c can be approximately 108 degrees.

The typical size and spacing of the embossed pattern 400 is substantially exaggerated for ease of illustration in the figures. In one embodiment, the spacing of the ridges can be about 20 ridges per inch about the circumference of the first roller 108a so that each embossed region 410 is about 0.45 to 0.5 inch in length. Due to the substantial thickness of the film of agricultural storage bags, which can be 8 mils in thickness or greater, the number of ridges may be substantially less than 20 ridges per inch with as little as 4 ridges per inch. With a spacing of 4 ridges per inch, each embossed region would have a length of approximately 2.5 inches. In another embodiment of the present invention, the spacing of the ridges can be about 10 ridges per inch or less and the depth of height of the ridges can be a minimum of 0.280 inches.

With the embossed pattern 400 applied to gusseted tube 104 or flattened tube 106 with the linear embossments 630 extending in the machine direction and the opposing vertices aligned in the cross-direction, the embossed pattern 400 allows the polymeric film to expand in the cross-direction of the agricultural storage tube. Due to the hexagonal shape of the embossed regions 410, the depicted embodiment of the embossed pattern 400 provides features to prevent tear propagation since a tear propagating in the cross direction will be interrupted by an embossed region 410.

Figure 5:
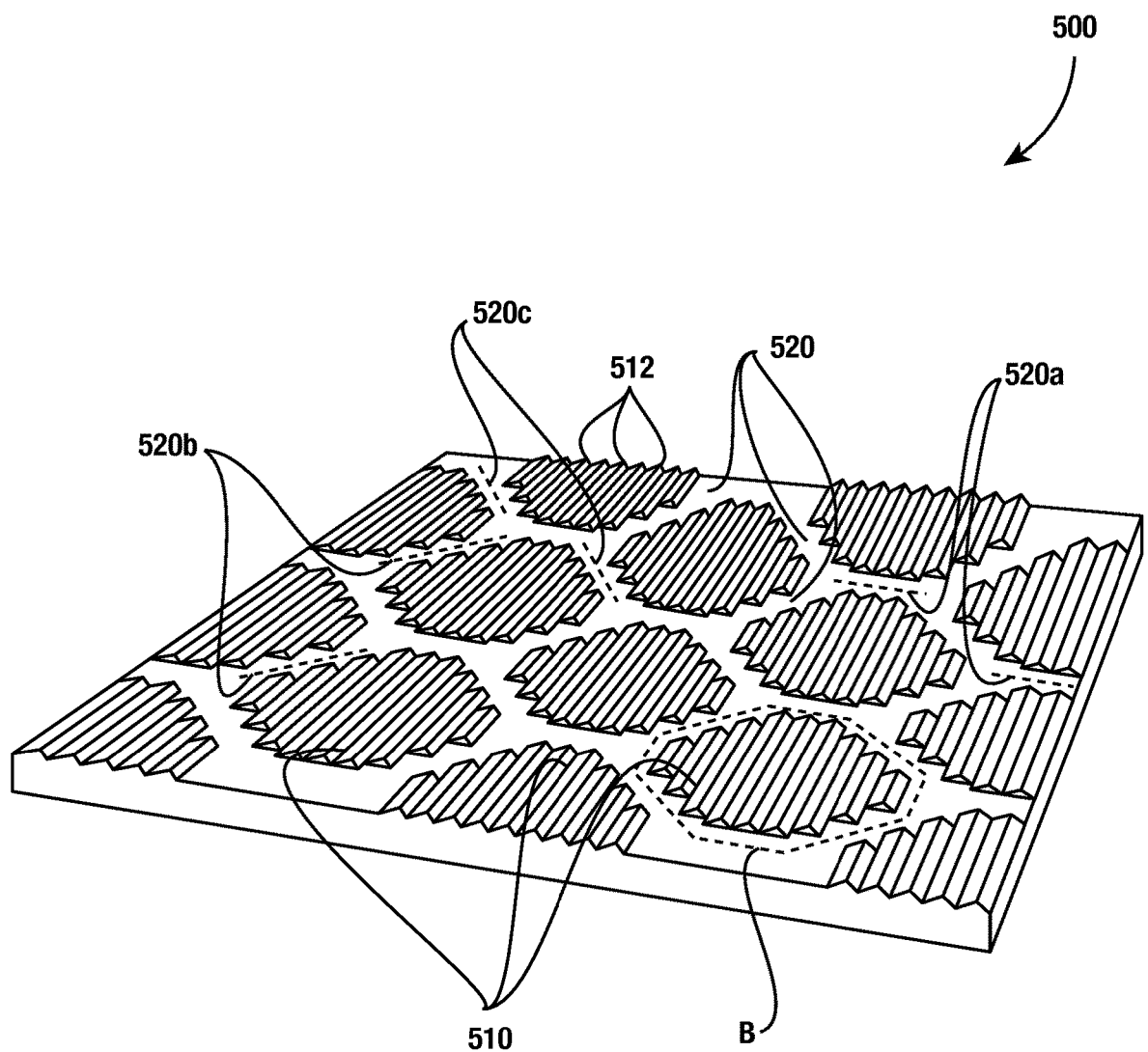
FIG. 5 depicts a perspective planar view of a section of an embossing roller of the first and second embodiments.

Now turning to FIG. 5, a detailed planar or flattened view of a section of the circumferential surface of the first intermeshing roller 108a is shown. The orientation of the embossing pattern 500 is oriented approximately 90 degrees from its orientation as illustrated in FIGS. 1a and 1b for ease of illustration. As shown in FIG. 5, the embossing pattern 500 can have a plurality of embossment regions 510. The hexagonal shape of one of the embossment regions 510 is indicated by dashed lines B in FIG. 5, which is shown for reference only and forms no structure of the disclosed invention. As further shown in FIG. 5, each embossment region 510 can comprise a set of embossment ridges 512. Each of the embossment ridges 512 can be generally linear, parallel to each other and generally spaced evenly from each other. The quantity of embossment ridges 512 in an embossment region 510 can vary, with FIG. 5 showing 9 embossment regions, but it is contemplated the quantity can be as low as 5 and as high as 13 or greater.

As further shown in FIG. 5, each of the embossment regions can be bounded by a continuous embossment boundary 520. The embossment boundary can be substantially flat in relation to the embossment ridges 512 and devoid of any embossment ridges. The embossment boundary 520 can comprise first segments 520a, second segments 520b, and third segments 520c. As shown in FIG. 5, each of the three segments can extend in a different direction from each other. As should be apparent to one of ordinary skill in the art, the surface of the section illustrated in FIG. 5 necessarily follows the curvature of the surface of first roller 108a but is shown without the curvature (planar) for ease of illustration. The features of the embossing pattern 500 correspond with the detailed emboss pattern 400 of FIG. 4. The embossing pattern 500 integrated into intermeshing roller 108b applies the embossed pattern 400 onto tube 104 or 106.

Now returning to FIGS. 1a and 1b, the embossing ridges 512 (as shown in FIG. 5) of the first intermeshing roller 108a, are offset from the concentric ridges 126 of the second roller 108b so that the ridges of the two rollers intermesh. As illustrated in FIGS. 1a and 1b, once the collapsed tube 104 or 106 passes through the two intermeshed rollers 108a and 108b, the embossed pattern 400, as illustrated by FIG. 4, is formed into the polymeric film of the collapsed tube 104 or 106.

It may be desirable to provide nip rollers on both sides of the embossing operation to control tension in the collapsed tube as it enters and exits the intermeshing rollers 108a and 108b. FIGS. 1a and 1b show a pair of pre-embossing rollers 180 controlling tension in the collapsed tube prior to the film's entry into the nip of the intermeshing rollers. The figures further show a pair of post-embossing rollers 182 controlling tension in the collapsed tube 104 or 106 upon exiting the intermeshing rollers. Both the pre and post embossing rollers 180 and 182 are typical nip rollers as known in the art. The rotational speed of the pre and post embossing rollers 180 and 182 may be controlled independently from each other and from the intermeshing rollers 108a and 108b so that the tension in the tube 104 or 106 may be adequately controlled to aid in the desired engagement of the intermeshing rollers 108a and 108b into the polymeric film of the collapsed tube 104 or 106.

Figure 6:
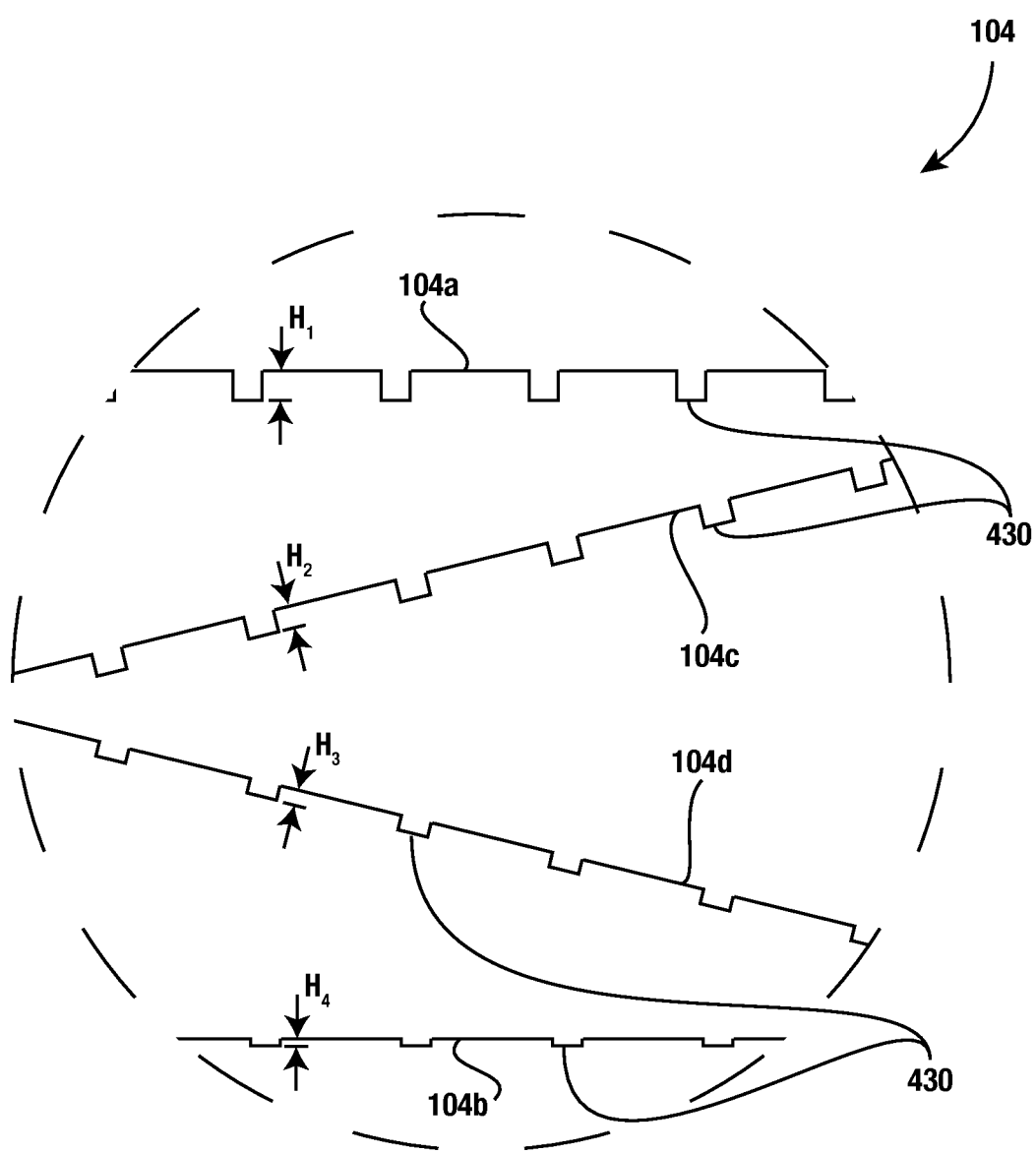

Now turning to FIG. 6, a detailed partial view of the cross-section of FIG. 3a is shown. FIG. 6 illustrates a detailed cross-sectional view of the linear embossments 430 formed by the intermeshing rollers 108a and 108b. It is contemplated that the linear embossments 430 within the same layer of the gusseted tube 106 after being embossed are substantially the same. However, due to the simultaneous embossment of the four layers 104a, 104b, 104c, and 104d, a height of the linear embossments 430 can vary between layers. For instance, when passing through the intermeshing rollers 108a and 108b, outer upper layer 104a is embossed via direct contact with embossment ridges 512 (as illustrated in FIG. 5) while inner upper layer 104c is embossed indirectly by embossment ridges 512 with pressure applied to inner layer 104c by outer layer 104a. In a likewise manner, inner lower layer 104d is embossed via contact with inner upper layer 104c and outer lower layer 104b is embossed via contact with inner lower layer 104d.

Due to each successive layer displacing a fraction of the height of embossment ridges 512, a height for each successive layer's linear embossments 430 (as shown in FIG. 4) is likely to decrease for each layer separated from direct contact with embossment ridges 512 by intervening layers. Thus, the height $H_2$ of the linear embossment ridges of inner upper layer 104c can be less than the height $H_1$ of the linear embossments of outer upper layer 104a. It follows that the height $H_3$ of the inner lower layer 104c can be less than the height $H_2$ of upper inner layer 104c and that the height $H_4$ of outer lower layer 104b can be less than height $H_3$ of inner lower layer 104d.

When the gusseted collapsed tube 104 is expanded and un-gusseted after being embossed in the gusseted configuration as described depicted in FIG. 1b, six separate tube sections are defined in the expanded collapsed tube 110. These six separate tube sections are due to the variation in height of the linear embossments 430 as described above regarding FIG. 6. FIGS. 7a and 7b show upper and lower planar views of un-gusseted tube 110 after being embossed in a gusseted configuration. The two figures show upper central section $A_1$ and lower central section $A_4$, first and second upper outer sections $A_2$ and $A_3$, and first and second lower outer sections $A_5$, and $A_6$. The bold broken lines of FIGS. 7a and 7b show boundaries between adjacent sections. Sections $A_1$-$A_3$ are shown in FIG. 7a and sections $A_4$-$A_6$ are shown in FIG. 7b. Each section is defined by a difference in height of the embossment ridges in comparison to the height of the embossment ridges of adjacent sections. Each section extends lengthwise in the machine direction of the un-gusseted tube 110.

Upper central section $A_1$ corresponds to upper outer layer 104a with embossment ridges having height $H_1$ while first and second upper outer sections $A_2$ and $A_3$ correspond to inner upper layer 104c with embossment ridges having height $H_2$. First and second lower outer sections $A_5$ and $A_6$ correspond to inner lower layer 104d with embossment ridges having height $H_3$ while lower central section $A_4$ corresponds to outer lower layer 104b with embossment sections having height $H_4$.

Further examining FIGS. 7a and 7b, the upper central section $A_1$ extends from a first side 109a to a second 109b of the central section $A_1$. The first upper outer section $A_2$ extends from the first side 109a of section $A_1$ to a first side 110a of the upper layer of tube 110. Second upper outer section $A_3$ extends from the second side 109b of upper central section $A_1$ to a second side 110b of the upper layer of tube 110. Lower central section $A_4$ extends from a first side 111a to a second 111b of the central section $A_4$. The lower outer section $A_5$ extends from a first side 111a of lower central section $A_4$ to the first side 110a of the lower layer of tube 110. Second lower outer section $A_6$ extends from a second side 111b of Section $A_5$ to the second side 110b on the upper layer of tube 110.

As previously addressed, the embossed pattern 400 can extend across an entire width of the tube 104 or 106. However, in an alternative embodiment of the invention, the embossed pattern may extend in the machine direction an entire length of the tube 104 or 106 but only extend in the cross direction a fraction of the width of tube 104 or 106. In this alternative embodiment, a length of one or both of the intermeshing rollers 108 may be shorter than a width of the tube 104 or 106 such that only a partial width of the tube is embossed.

Figure 8:
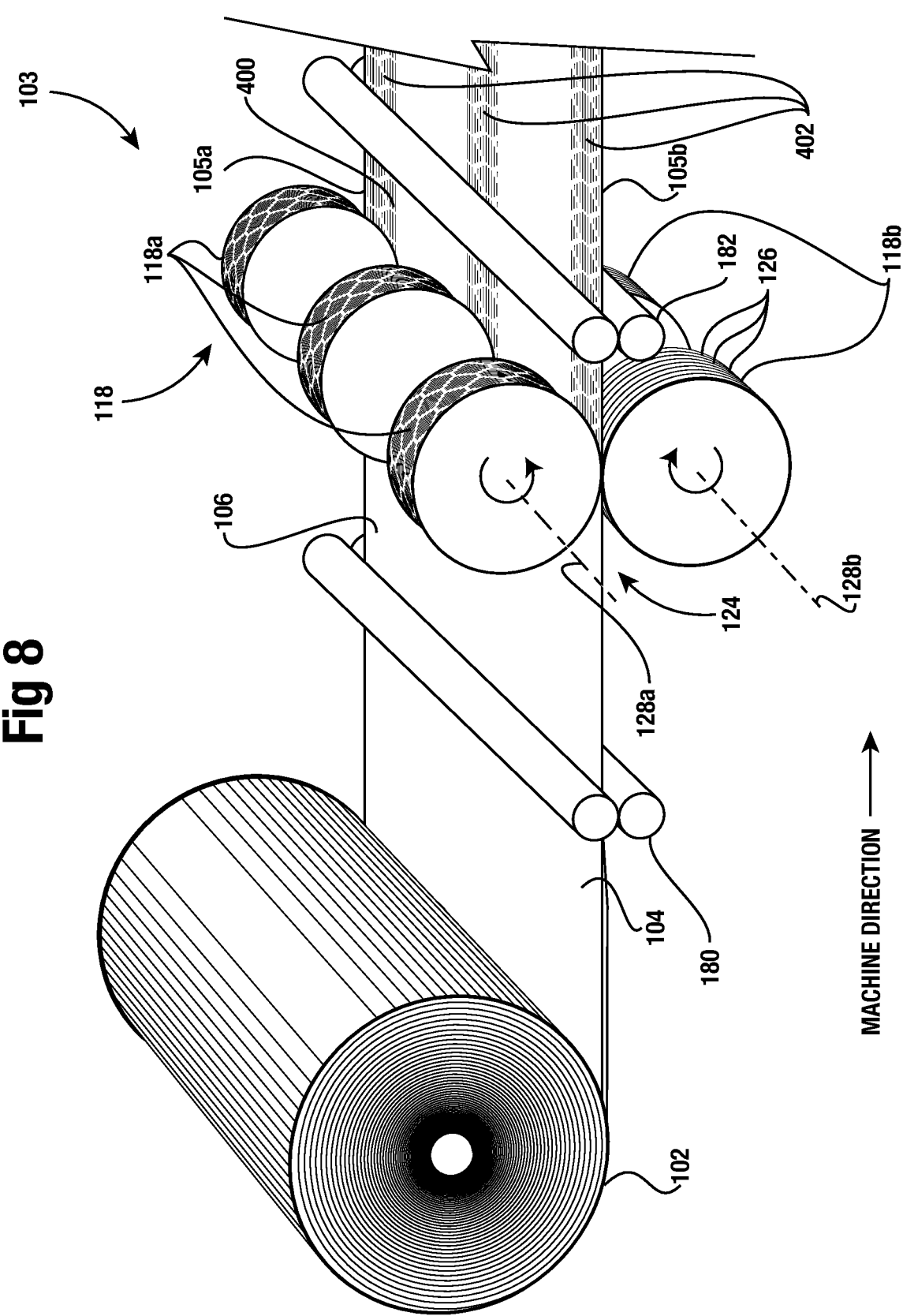
FIG. 8 depicts a perspective view of an additional embodiment of the present invention.

As shown in FIG. 8, more than one set of fractional width intermeshing rollers 118 may apply more than one fractional width embossed pattern to tube 104 or 106 in bag forming process 103. FIG. 8 illustrates that the embossed pattern 400 may be applied by a plurality of sets of intermeshing rollers 118 with each set of intermeshing rollers 118 having a fractional width of tube 104. Each set of intermeshing rollers 118 thus only embosses a fractional width of tube 104 as further shown in FIG. 8. Thus, the embossing results in a plurality of embossed sections 402 extending continuously from the first end to a second end of tube 104 in its machine direction while each section only traverses a fraction of the width of tube 104 in its cross direction. In between each of the embossed sections 402 a partial width of unembossed and substantially smooth film may be defined as shown in FIG. 8.

Each set of rollers 118 of FIG. 8 may comprise a first roller 118a with an embossing pattern defined about its surface and a second roller 118b with a plurality of concentric ridges dispersed about the roller as previously discussed regarding intermeshing rollers 108. Although not shown, the plurality of fractional width intermeshing rollers 118 may also be used to emboss a plurality of fractional width sections on tube 106 of FIG. 1a. Furthermore, in a further embodiment of the invention, rather than separate rollers, fractional width embossed sections 402 may be formed with a single set of intermeshing rollers with the embossing pattern only defined on the first roller in partial widths and a recessed surface defined on the first roller where the embossing pattern is not to be applied to the flattened tube.

Figure 9:
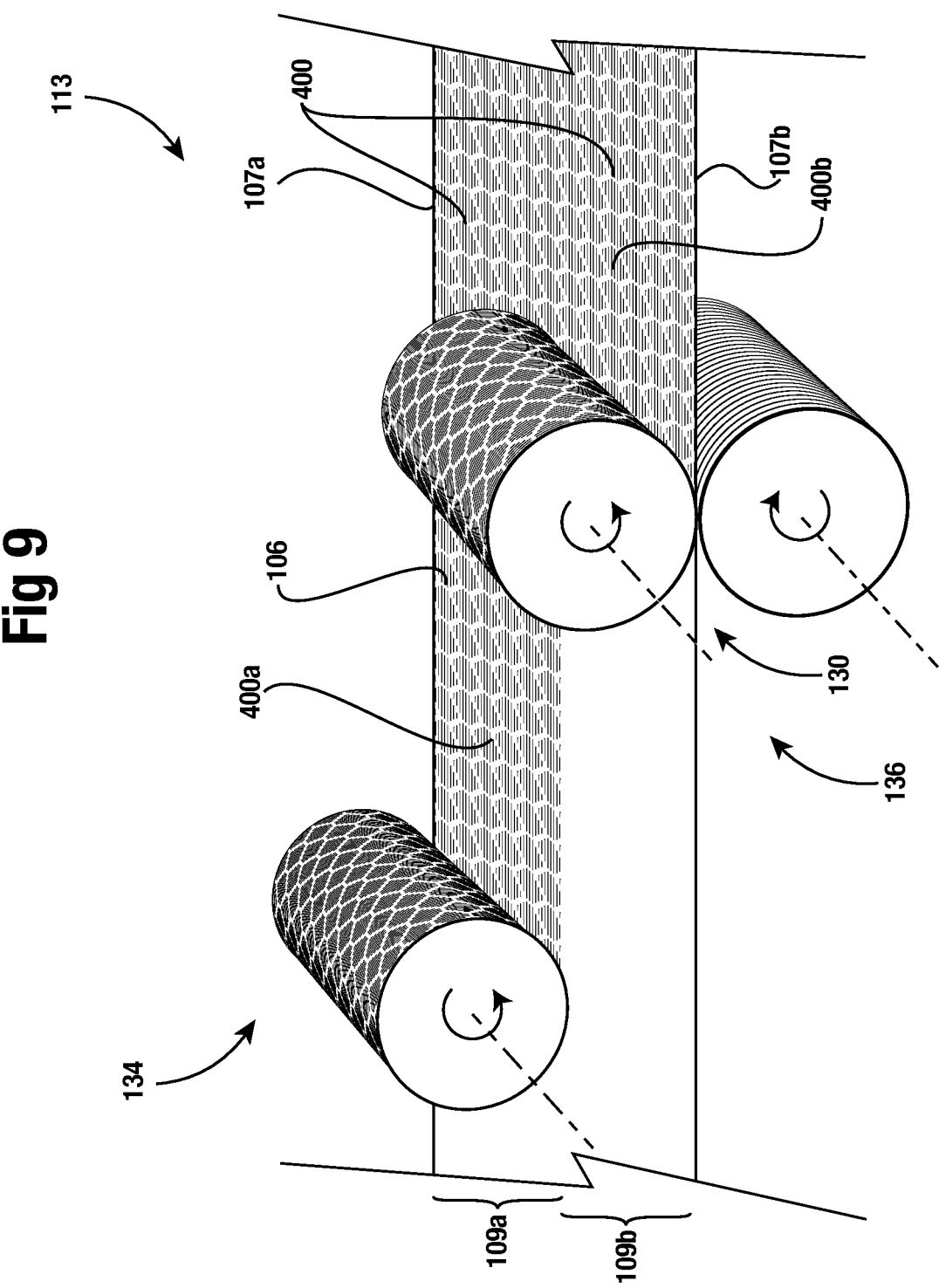
FIG. 9 depicts a perspective view of a further embodiment of the present invention.

Shown in FIG. 9 is a further embodiment of the present invention. In a likewise fashion to the FIG. 8 embodiment, the FIG. 9 embodiment illustrates more than one set of intermeshing rollers embossing collapsed tube 106 by an embossing process 113. However, unlike FIG. 8, in the FIG. 9 embodiment a plurality of sets or pairs of intermeshing rollers can cooperate to emboss a continuous width of a collapsed tube, up to an entire width of the collapsed tube. The tube can be divided into a plurality of fractional widths with each fractional width embossed by a different set of intermeshing rollers.

FIG. 9 shows that first and second pairs of intermeshing rollers 134 and 136 can cooperate to emboss substantially the entire width of collapsed tube 106. The first pair of intermeshing rollers 134 can emboss a first fractional width 109a of tube 106 with a first embossed pattern 400a and the second pair of intermeshing rollers 136 can emboss a second fractional width 109b of tube 106 with a second embossed pattern 400b. The first and second fractional widths 109a and 109b can be adjacent to and continuous with each other. The first and second embossed patterns 400a and 400b provided by the first and second set of intermeshing rollers 134 and 136 can be substantially the same or the first embossed pattern 400a can be distinctive from the second embossed pattern 400b.

FIG. 9 further shows that the first and second embossed patterns 400a and 400b when combined encompass the entire width of tube 106. However, in certain embodiments, one or both of the widths of the first and second sets of intermeshing rollers 134 and 136 may exceed one or both of the first and second fractional widths so that the first embossed pattern 400a overlaps the second embossed pattern 400b to ensure that the embossed pattern 400 is applied to an entire width of collapsed tube 106. Although illustrated on flattened tube 106, one skilled in the art should recognize that the method illustrated by FIG. 9 may be equally applied to gusseted tube 104. Rather than only two pairs of intermeshing rollers, it is contemplated that many more sets of intermeshing rollers may be used to emboss a width of a collapsed tube in a similar fashion. Once the embossing of collapsed tube is complete it can be formed into a plurality of annular folds.

Methods for forming collapsed tubes 104 and 106 into a plurality of annular flat folds are known. One such method and an apparatus for carrying out said method are disclosed in U.S. Pat. No. 4,721,503, issued to Rasmussen et al., filed on Jun. 18, 1987, and entitled Agricultural Storage Bag Folding Apparatus and Method (Rasmussen), which is hereby incorporated by reference in its entirety into this application. FIGS. 10-17 and the following written description describe, in general, the Rasmussen apparatus and method. However, unlike Rasmussen, the description below only addresses the folding of a single tube of polymeric film, such as tube 104 or 106, rather than combining two separate tubes into a folded structure as described by Rasmussen. Rasmussen may be referenced for a more thorough description of the apparatus and method than is provided below.

Figure 10:
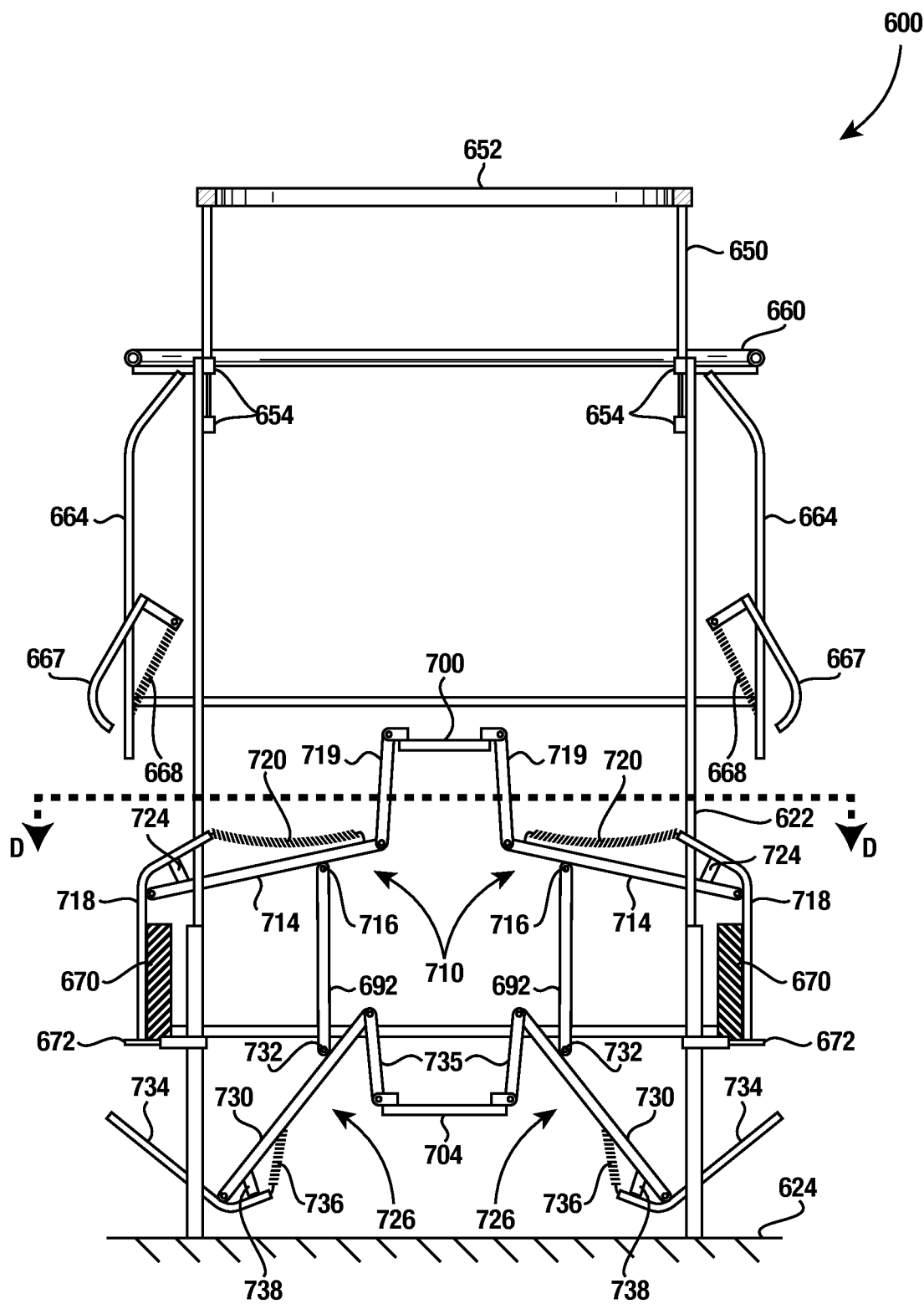
FIG. 10 depicts a side view of a bag folding apparatus utilized in the invention in which certain parts of the apparatus have been broken away to more clearly illustrate certain features.

Shown in FIG. 10 is folding apparatus or folder 600. Folder 600 includes a frame 622 which is supported on an underlying surface 624. An advancing mechanism 650 functions to withdraw tubular material 104 from roll stock or other supply of collapsed tube 104. The advancing mechanism 650 includes a circular subframe 652 which is supported on the frame 622 by a plurality of guides 654. The guides 654 support the subframe 652 for vertical reciprocation with respect to the frame 622.

Surrounding the upper end of the frame 622 and the advancing mechanism mounted thereon is a circular guide 660. A plurality of guide bars 664 extend downwardly from the circular guide 660 and are located at circumferentially spaced points around the periphery of the circular guide 660. Braking levers 667 are pivotally supported on the guide bars 664 and are biased by springs 668 to pivot outwardly from guide bars 664. Braking levers 667 serve to control the passage of tubular bag material downwardly over folder 600.

Supported below the lower ends of guide bars 664 on frame 622 is an annular pad 670 comprising a number of fold supporting surfaces. A plurality of fold support members, such as bag supporting pins 672, are mounted beneath annular pad 670 and are positioned at circumferentially spaced points around the periphery of pad 670. Each bag-supporting pin 672 is secured to frame 622 and is biased outwardly. Pins 672 are normally positioned as shown in FIG. 10, wherein pins 672 extend radially outwardly substantially beyond the outermost periphery of annular pad 670.

Figure 11:
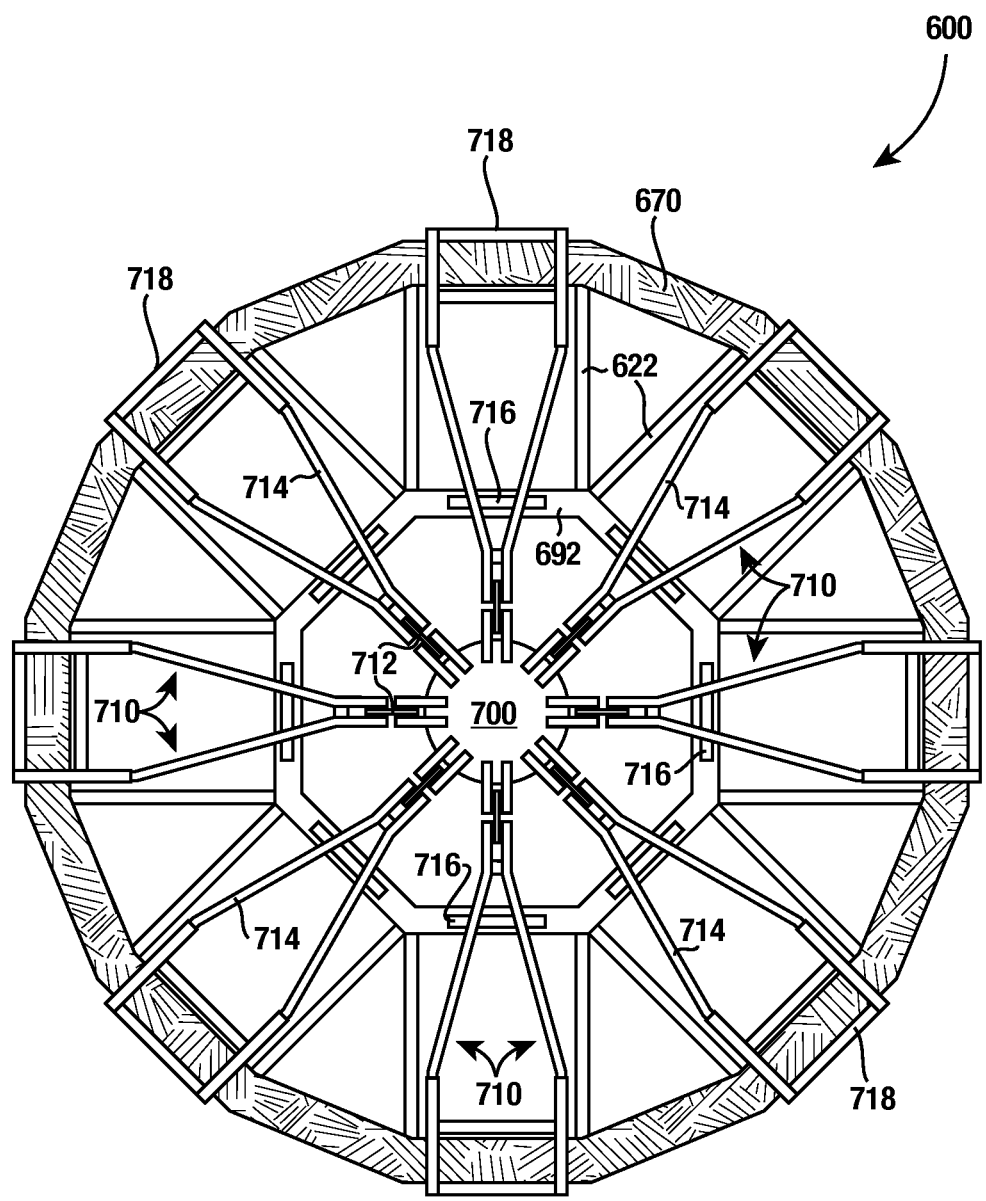
FIG. 11 depicts a cross-sectional view of the folding apparatus of FIG. 10 taken along the plane indicated by line D-D of FIG. 10.

As best shown in FIG. 11, located at circumferentially spaced points around the periphery of a subframe 692 are upper arms 710. Each upper arm 710 includes an A-shaped arm 714 which is pivotally supported by subframe 692 at a point 716. Each A-shaped arm 714 in turn pivotally supports a clamping member 718 at the distal end thereof. Each clamping member 718 is shown resting against annular pad 670. Referring again to FIG. 10, each upper arm 710 also includes a link 719 which functions to pivotally interconnect plate 700 to each of the other A-shaped arms 714. Plate 700 is limited to vertical motion along a centerline of annular pad 670 and folder 600. An extension spring 720 is secured between the upper end of each clamping member 718 and the proximal end of each A-shaped arm 714 to urge clamping member 718 into engagement with a stop 724 mounted on the A-shaped arm 714.

A plurality of lower arms 726 are located at circumferentially spaced points around the periphery of frame 722. The lower arms 726 are equal in number to the upper arms 710, and each lower arm 726 is positioned between a pair of corresponding upper arms 710. Each lower arm 726 includes an A-shaped arm 730, similar to the A-shaped arms 714 of the upper arms 710, which are pivotally supported by subframe 692 at 732. Each A-shaped arm 730 in turn pivotally supports a clamping member 734 at the distal end thereof. Each lower arm 726 also includes a link 735 which serves to pivotally interconnect plate 704 with each A-shaped arm 730. In a likewise manner to plate 700, plate 704 is also limited to vertical motion along a centerline of folder 600. An extension spring 736 is secured between each clamping member 734 and the proximal end of each A-shaped arm 730 to urge clamping member 734 into engagement with a stop 738 mounted on the A-shaped arm 730.

Figure 12:
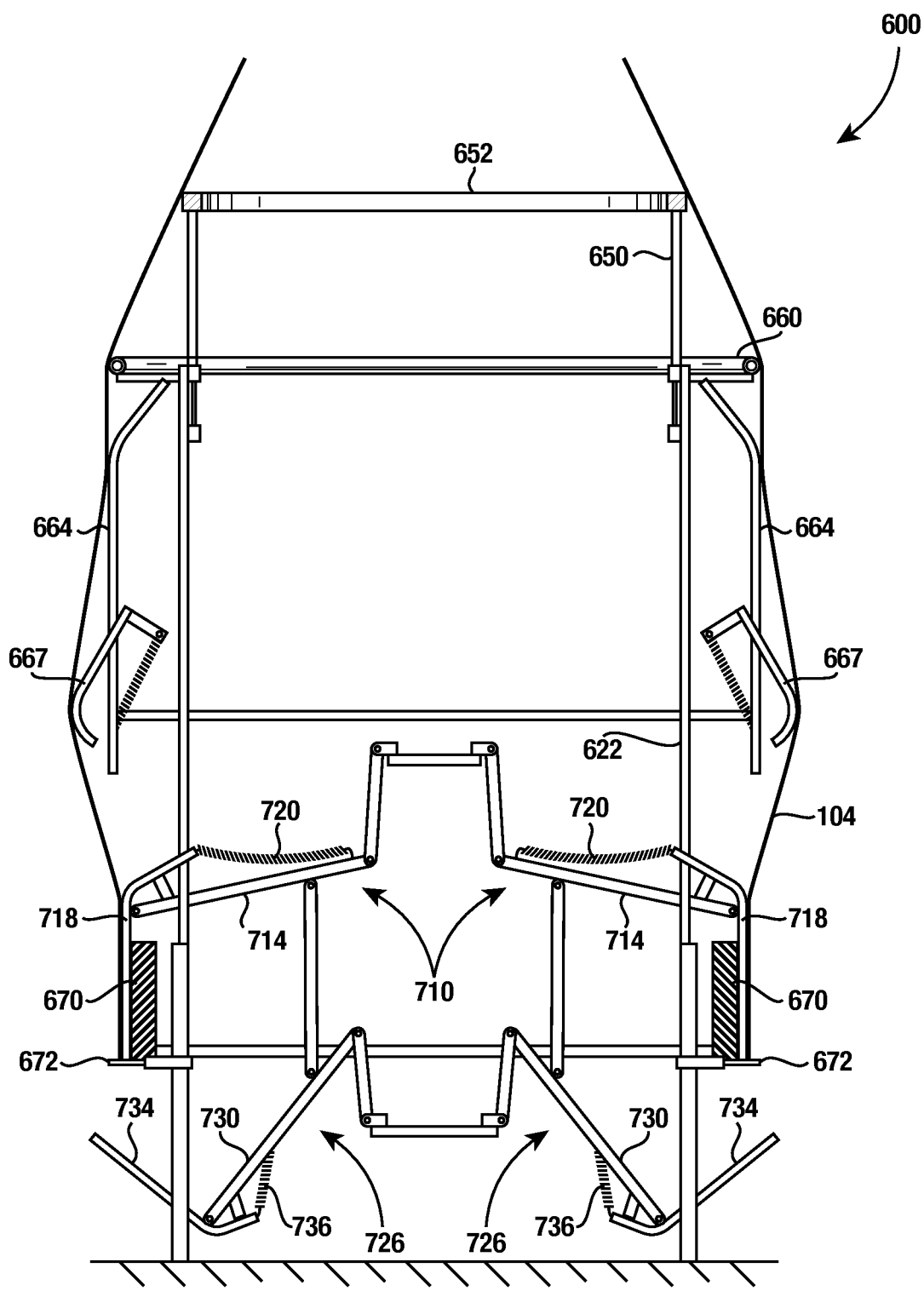
FIGS. 12-16 depict side views of the apparatus of FIG. 10 illustrating successive steps in a method of folding a collapsed tube into a plurality of flat annular folds.

The operation of folder 600 is illustrated in FIGS. 12-18. Referring to FIG. 12, a leading edge section of tube 104 is advanced downwardly about annular pad 670 and clamping members 718 of upper arms 710, until resting against pins 672. At this point, pins 672 are fully extended, upper arms 710 are fully extended downward, and lower arms 726 are fully retracted. Tube 104 is guided in its downward movement relative to frame 622 of bag folding apparatus 600 by circular guide 660 and guide bars 664. Movement of tube 104 is regulated by braking levers 667, which function to prevent the uncontrolled downward movement of tube 104.

Figure 13:
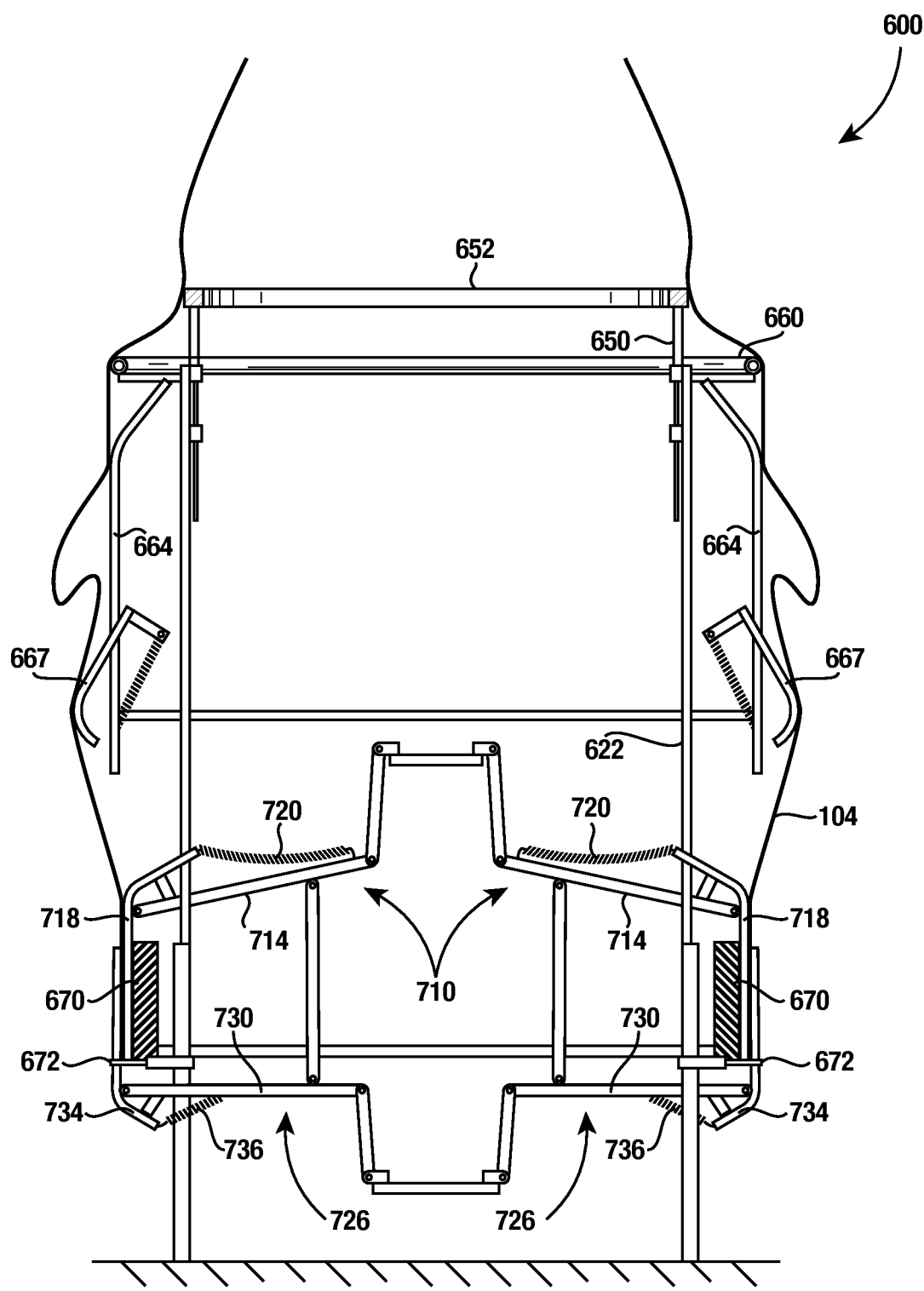

Now referring to FIG. 13, the lower arms 726 are extended upward, causing the clamping members 734 of lower arms 726 to clamp securely the leading edge section of tube 104 against annular pad 670. The circular subframe 652 comprising advancing mechanism 650 also moves downwardly, which in turn allows tube 104 to move downwardly along frame 622 under control of braking levers 667.

Figure 14:
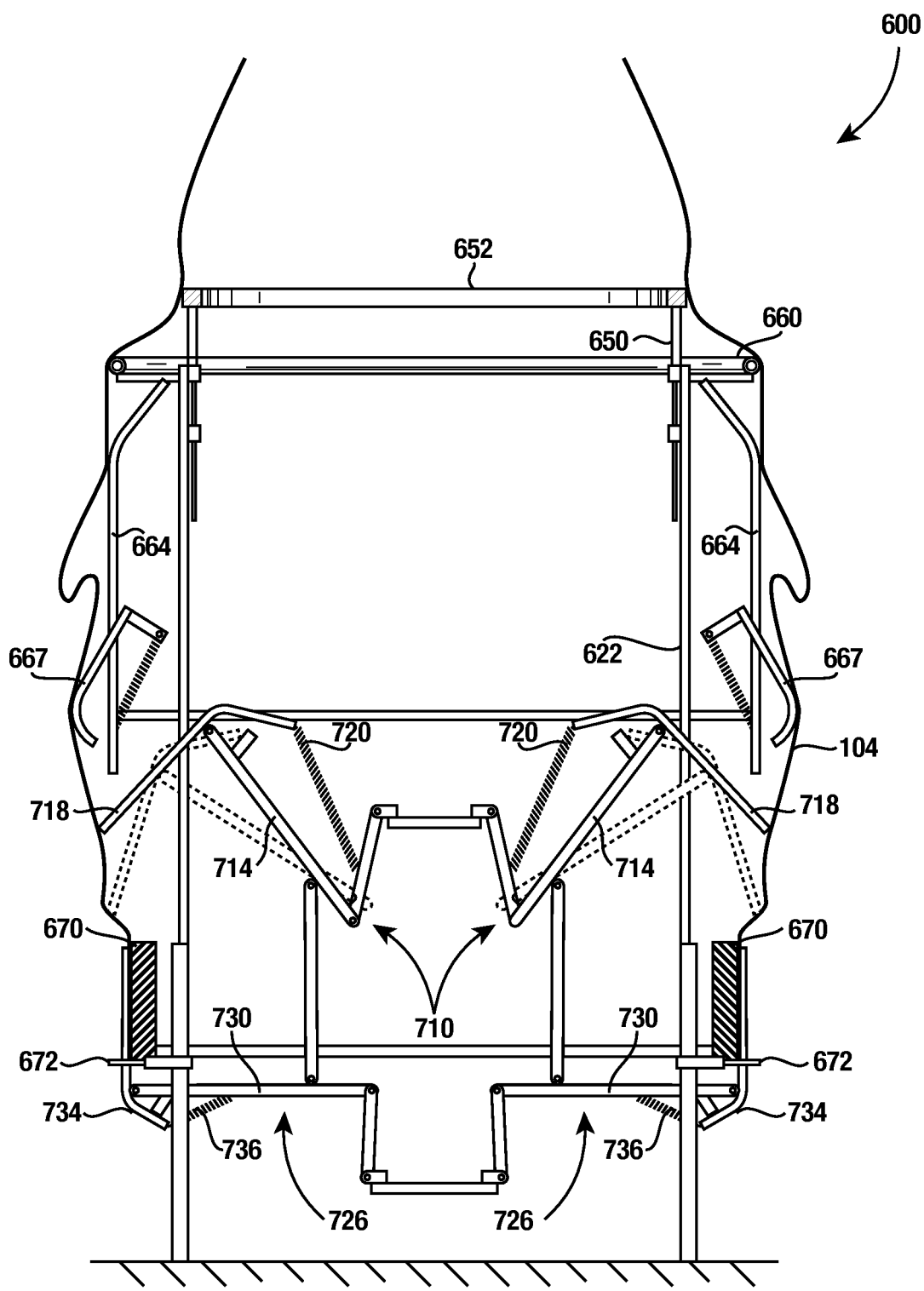

As illustrated in FIG. 14, upper arms 710 are now pivoted upwards. Clamping members 718 are initially moved into the positions as illustrated by broken lines in FIG. 14, wherein the leading edge section of tube 104 pivots clamping members 718 toward their respective A-shaped arms 714 against the tension of extension springs 720. As the upper arms 710 are raised further, clamping members 718 are fully withdrawn from the leading edge section of tube 104 and are then snapped outwardly under the action of extension springs 720 into the positions illustrated by the full lines in FIG. 14. During this operation, the leading edge section of tube 104 remains tightly clamped against annular pad 670 by the clamping members 734 of the lower arms 726.

Figure 15:
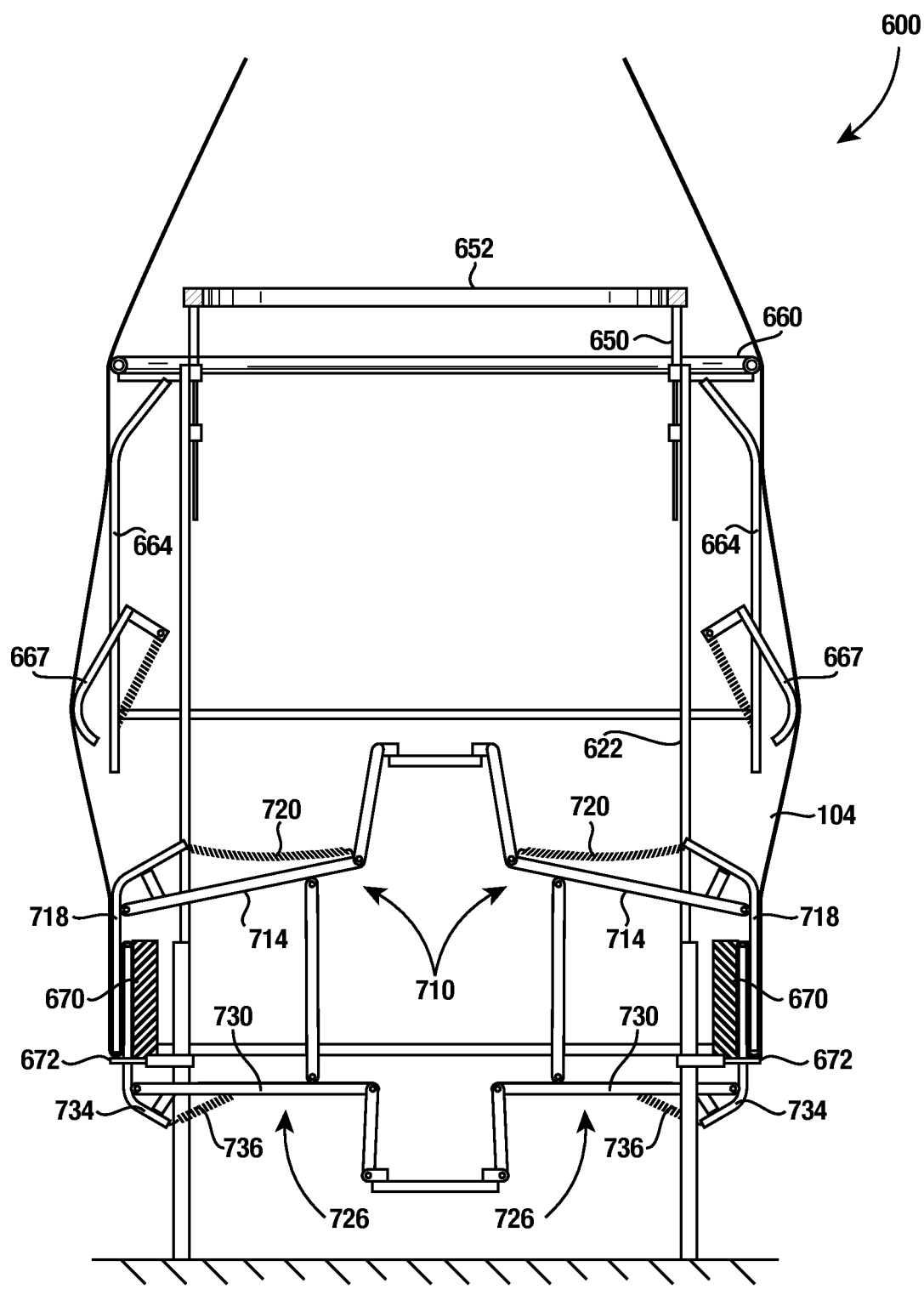

Now referring to FIG. 15, clamping members 718 of upper arms 710 are extended into a clamping relationship with respect to annular pad 670. During this operation, the portion of tube 104 that is immediately adjacent to the leading edge section of the tube 104, a first interior section, is expanded into a first expanded section and folded downwardly over clamping members 734 of lower arms 726, thus forming a first folded section in tube 104. At this point, the first folded section is securely clamped against annular pad 670 under the action of clamping members 718 of upper arms 710.

Figure 16:
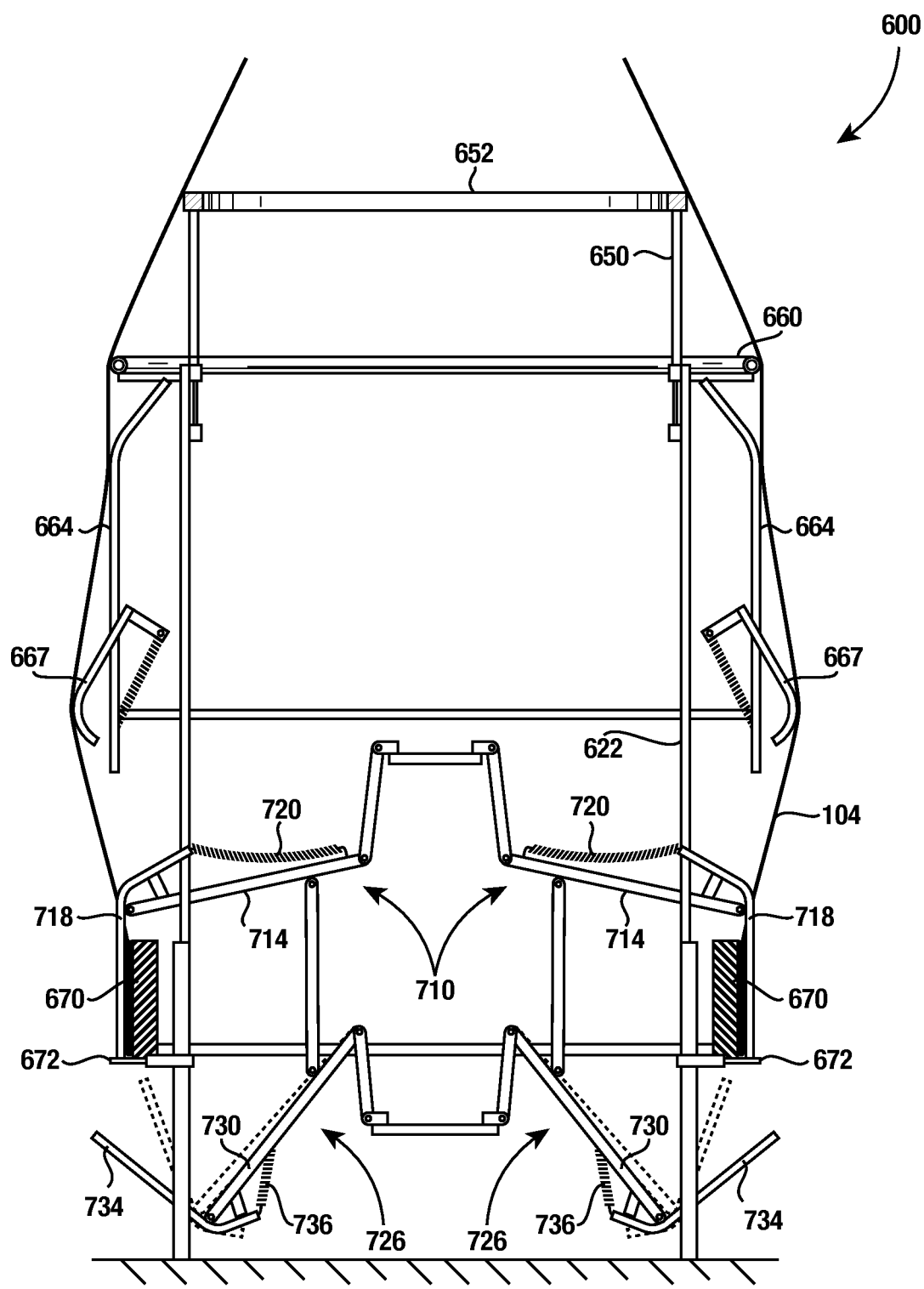

The next step in the operation of folder 600 comprises retraction of lower arms 726. As shown in FIG. 16, clamping members 734 of lower arms 726 are initially moved into the positions shown by broken lines wherein the first folded section of tube 104 pivots the clamping members 734 toward their respective A-shaped arms 730 against the tension of extension springs 736. As lower arms 726 are retracted further, clamping members 734 are fully withdrawn from the first folded section of the tube 104 and are then snapped outwardly under the action of extension springs 736 into the positions shown by full lines in FIG. 16.

At this point, the component parts of folder 600 are positioned as shown in FIG. 10, except for the first folded section that has been formed in tube 104. The foregoing steps are then repeated for a second interior section of tube 104 as described for FIGS. 11-15, expanding the second interior section to arrive at a second expanded section, and folding it to arrive at a second folded section. The same foregoing steps are further repeated for a third interior section, etc., until the entire length of tube 104 has been accumulated in a series of flat annular folds. Each of the folds extends parallel to and has substantially the same vertical dimension as the annular pad 670 as shown in the above-described figures.

Figure 17:
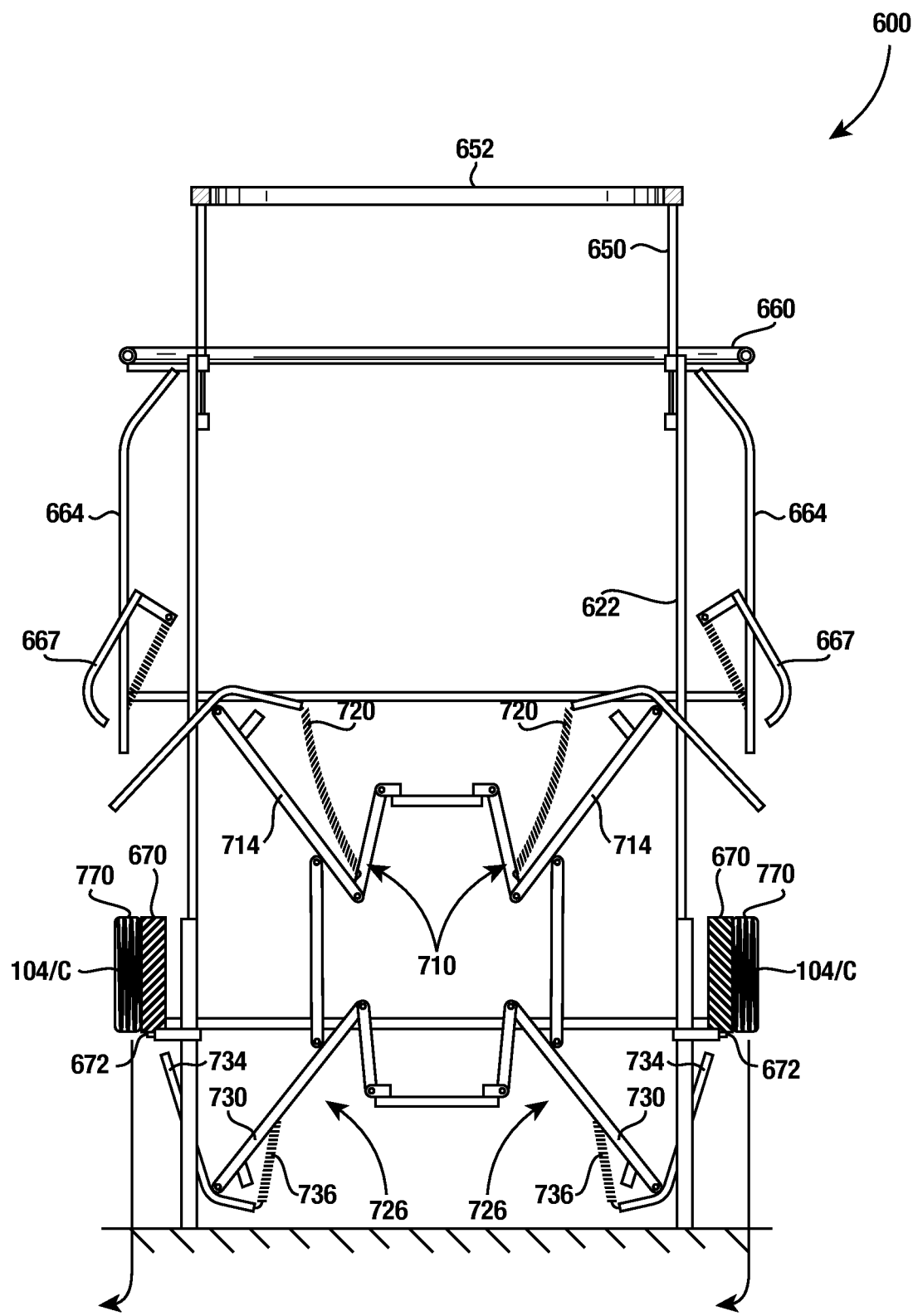
FIG. 17 depicts a side view of the apparatus illustrated in the preceding figures illustrating removal of a flat-folded agricultural storage bag from the folding apparatus.

FIG. 17 illustrates folder 600 with tube 104 in a fully folded condition once the entire tube 104 has been folded. Elongate flexible members 770, which may comprise cords, plastic strapping material, etc., are secured around the folds comprising the tube 104, or now an agricultural storage bag C, at circumferentially spaced points in order to maintain bag C in the folded condition. After the elongate flexible members 770 are secured in place, pins 672 are retracted to allow removal of bag C. Bag C can then be removed from folder and packaged for shipment.

As previously noted, the specific embodiments depicted herein are not intended to limit the scope of the present invention. Indeed, it is contemplated that any number of different embodiments may be utilized without diverging from the spirit of the invention. Therefore, the appended claims are intended to more fully encompass the full scope of the present invention.

What is claimed is:

1. A method of forming an embossed agricultural storage bag, the method comprising:
   supplying a collapsed tube of polymeric film, the collapsed tube gusseted on opposing first and second sides of the collapsed tube to form a gusseted tube,
   the gusseted tube comprising at least six layers of film including upper and lower outer layers, first side upper and lower inner layers, and second side upper and lower inner layers,
       the inner layers in between the outer layers, the upper outer layer and the first side upper inner layer directly connected to each other at a first side upper folded edge, the lower outer layer and the first side lower inner layer directly connected to each other at a first side middle folded edge, and the first side upper inner layer and the first side lower inner layer directly connected to each other at a first side lower folded edge,
   a pair of intermeshing rollers embossing an embossed pattern simultaneously onto the at least six layers of film, the intermeshing rollers contacting directly the outer layers and indirectly the inner layers via the outer layers, the pair of intermeshing rollers embossing a plurality of embossments into each layer comprising the embossed pattern, the plurality of embossments having generally the same height within a layer of the at least four layers, a height of the plurality of embossments of the upper outer layer greater than a height of the plurality of embossments of the lower outer layer, and folding the embossed gusseted tube into a plurality of annular folds.

2. The method of claim 1 wherein:

the plurality of embossments having a linear shape.

3. The method of claim 2 further comprising:

a height of the plurality of linear embossments of the first side upper inner layer is greater than a height of the plurality of linear embossments of the first side lower inner layer.

4. The method of claim 3 further comprising:

the height of the plurality of linear embossments of the upper outer layer is greater than a height of the plurality of linear embossments of the first side upper inner layer.

5. The method of claim 1 further comprising:

the embossed pattern of the upper outer layer having a constant height H1, the embossed pattern of the first side inner upper layer between the first side upper folded edge and the first side middle folded edge having a constant height H2, the embossed pattern of the first side inner lower layer between the first side middle folded edge and the first side lower folded edge having a constant height H3, and the embossed pattern of the lower outer layer having a constant height H4, and H3 greater than H4, H2 greater than H3, and H1 greater than H2.

6. A method of forming an embossed agricultural storage bag, the method comprising:

supplying a collapsed tube of polymeric film, gusseting the collapsed tube to form a gusseted tube, the gusseted tube comprising a gusseted first side and an opposing gusseted second side, the first side of the gusseted tube comprising four layers of interconnected film, the interconnected layers including upper and lower outer layers, and upper and lower inner layers, the inner layers in between the outer layers, the upper outer layer and the upper inner layer directly connected to each other, the lower outer layer and the lower inner layer directly connected to each other, and the upper inner layer and the lower inner layer directly connected to each other, a pair of intermeshing rollers embossing an embossed pattern simultaneously onto the interconnected layers, the intermeshing rollers contacting directly the outer layers and indirectly the inner layers via the outer layers, wherein aligned embossments of the embossed pattern of adjacent layers of the interconnected layers are intermeshed with each other and protrude in the same direction, and folding the gusseted tube into a plurality of annular folds.

7. The method of claim 6 further comprising:

a height of the plurality of linear embossments of the upper inner layer greater than a height of the plurality of linear embossments of lower inner layer.

8. The method of claim 6 further comprising:

the height of the plurality of linear embossments of the upper outer layer greater than a height of the plurality of linear embossments of the upper inner layer.

9. The method of claim 6 further comprising:

the embossed pattern of the upper outer layer having a constant height H1, the embossed pattern of the inner upper layers having a constant height H2, the embossed pattern of the inner lower layer having a constant height H3, and the embossed pattern of the outer lower layer having a constant height H4, and H3 greater than H4, H2 greater than H3, and H1 greater than H2.

* * * * *